(12) United States Patent
Shiina et al.

(10) Patent No.: US 7,170,922 B2
(45) Date of Patent: Jan. 30, 2007

(54) TRANSMISSION TIMING CONTROL DEVICE, DIGITAL ROLL-OFF FILTER, AND MOBILE RADIO TERMINAL FOR DIGITAL RADIO COMMUNICATION

(75) Inventors: Sanshirou Shiina, Gifu (JP); Norihisa Takayama, Hashima (JP)

(73) Assignee: Sanyo Electric Co., Ltd., Osaka (JP)

( * ) Notice: Subject to any disclaimer, the term of this patent is extended or adjusted under 35 U.S.C. 154(b) by 825 days.

(21) Appl. No.: 10/144,855

(22) Filed: May 15, 2002

(65) Prior Publication Data

US 2002/0176481 A1 Nov. 28, 2002

(30) Foreign Application Priority Data

| May 18, 2001 | (JP) | ............................. 2001-148627 |
| Jun. 1, 2001 | (JP) | ............................. 2001-166177 |
| Apr. 24, 2002 | (JP) | ............................. 2002-121811 |

(51) Int. Cl.
*H04B 1/69* (2006.01)

(52) U.S. Cl. .................... 375/130; 375/229; 375/354; 375/505; 375/347

(58) Field of Classification Search ................ 375/130, 375/345, 340, 200, 308, 229, 354; 370/347, 370/505; 708/313
See application file for complete search history.

(56) References Cited

U.S. PATENT DOCUMENTS 5,291,527 A * 3/1994 Haruyama .................. 375/340

(Continued)

FOREIGN PATENT DOCUMENTS

EP 0 639 899 A1 2/1995

(Continued)

OTHER PUBLICATIONS

3GPP TS 25.211 V3.5.0(Dec. 2000), pp. 42.

(Continued)

*Primary Examiner*—Chieh M. Fan
*Assistant Examiner*—Eva Zheng
(74) *Attorney, Agent, or Firm*—Westerman, Hattori, Daniels & Adrian, LLP.

(57) ABSTRACT

In a mobile radio terminal at transmission timing control device, transmit data spread-modulated is delayed by a timing control portion with a timing of reception as a reference by a predetermined period of time having based on a unit time corresponding to a chip clock and it is then provided to a filtering portion. The filtering portion limits the transmit data in band and a timing control portion times transmission with a slight adjustment with an oversampling clock, a quadruple in frequency of the chip clock, serving as a unit time. In a mobile radio terminal at a digital roll-off filter, input digital data is held in accordance with a data period by a shift register successively. A counter counts in accordance with an oversampling period of 1/m and it is reset in accordance with a data period. A coefficient select circuit is driven by the counter's output to select and output repetitively, sequentially tap coefficients corresponding to m sampling points included in the data period for each tap output of the shift register. A multiplication circuit multiplies tap outputs by corresponding output tap coefficients and an addition circuit sums up such multiplications and provides the sum as a filter output.

2 Claims, 22 Drawing Sheets

U.S. PATENT DOCUMENTS

| | | | | |
|---|---|---|---|---|
| 5,754,626 A | * | 5/1998 | Otonari | 370/347 |
| 5,822,528 A | * | 10/1998 | Amano | 725/103 |
| 5,825,809 A | * | 10/1998 | Sim | 375/350 |
| 6,192,386 B1 | * | 2/2001 | Shinde | 708/313 |
| 6,205,189 B1 | * | 3/2001 | Ha | 375/345 |
| 6,317,440 B1 | * | 11/2001 | Sung | 370/505 |
| 6,680,981 B1 | * | 1/2004 | Nishizawa | 375/308 |

FOREIGN PATENT DOCUMENTS

| | | |
|---|---|---|
| EP | 1 024 625 A2 | 8/2000 |
| JP | 11-163766 | 6/1999 |
| JP | 2001-060893 | 3/2001 |

OTHER PUBLICATIONS

Notice of Ground of Rejection from the Japanese Patent Office in Patent Application No. 2001-148627 mailed May 18, 2004 and translation.

* cited by examiner

TRANSMISSION TIMING CONTROL DEVICE, DIGITAL ROLL-OFF FILTER, AND MOBILE RADIO TERMINAL FOR DIGITAL RADIO COMMUNICATION

BACKGROUND OF THE INVENTION

1. Field of the Invention

The present invention relates generally to transmission timing control devices, digital roll-off filters and mobile radio terminals in digital radio communications, and in particular to transmission timing control devices controlling a timing for transmission of a transmit signal with reference to a timing of reception of a receive signal, digital roll-off filters limiting a band for transmission of transmit digital data, and mobile radio terminals including the transmission timing control device or the digital roll-off filter in digital radio communications.

2. Description of the Background Art

Conventionally for example in Code Division Multiple Access (CDMA) system or other similar digital radio communications a transmission timing control system is adopted to control a timing for transmission of a transmit signal with reference to a timing of reception of a receive signal. If such a transmission timing control system is used in a digital radio communication a transmitting side is provided with a transmission timing control device controlling a timing for transmission of a transmit signal.

On the other hand, digital data transmission requires a broad transmission band (a frequency band to be occupied) as compared with data rate. Accordingly in digital radio communications a transmission side in view of effective use of radio waves uses a digital filter to limit a band of digital data to be transmitted.

FIG. 16 is a schematic block diagram showing a general configuration of a mobile radio terminal for digital radio communication that is provided with such a transmission timing control device and digital filter.

The FIG. 16 terminal generally includes an antenna 1, a radio processing portion 2, a baseband processing portion 3, an audio input/output device 4 formed of a microphone and a speaker, an external memory 5, a liquid crystal display (LCD), and a display/input device 6 formed of keys.

In particular, base band processing portion 3 includes a modem 3a, a channel codec 3b, a digital signal processor (DSP) 3c, a central processing unit (CPU) 3d, an internal memory 3e, an external interface 3f, and an internal bus 3g.

Antenna 1 receives a radio wave signal from a base station (not shown). Radio processing portion 2 converts the radio signal to a baseband signal and outputs it to baseband processing portion 3.

In baseband processing portion 3 the received signal is demodulated by modem 3a and furthermore decoded by channel codec 3b and output to DSP 3c.

DSP 3c processes the received signal in data and drives the speaker of audio input/output device 4 and converts the received signal to a voice.

On the other hand, audio input/output device 4 receives a voice through the microphone. DSP 3c processes the voice in data and outputs it to channel codec 3b, which in turn codes the received audio signal and outputs it to modem 3a, which in turn modulates the received transmit signal and outputs it to radio processing portion 2, which in turn subjects the transmit signal to a radio processing and transmits it through antenna 1 to a base station (not shown).

Note that modem 3a, channel codec 3b and DSP 3c connect through internal bus 3g to CPU 3d, internal memory 3e and external interface 3f. CPU 3d controls an operation of the entirety of the FIG. 16 terminal in accordance with a program stored in internal memory 3e. Furthermore, external interface 3f functions as an interface with external memory 5 and display/input device 6.

The transmission timing control device and the digital filter are respectively used in a mobile radio terminal at a transmitting modem to control a timing for transmission of a transmit signal and to shape a waveform of transmit data (or limit a transmission band). The transmitting modem is configured, as described hereinafter.

FIG. 17 is a functional block diagram showing a transmitting modem portion 30 extracted from modem 3a of baseband processing portion 3 shown in FIG. 16.

Channel codec 3b of FIG. 16 outputs transmit data which is in turn assembled by a radio frame assembling portion 3c into a radio frame and then provided to a spreading modulation portion 30b and spread-modulated.

More specifically in spreading modulation portion 30b a spreading code generated by a spreading code generator (not shown) is multiplexed (or XORed) with transmit data to spreading-modulate the data.

Spreading modulation portion 30b outputs the transmit data spread-modulated to waveform shaping portion 30a which in turn uses a digital filter (not shown) to shape a waveform to limit a transmission occupied band. Waveform shaping portion 30a outputs the transmit data shaped in waveform to radio processing portion 2 of FIG. 16.

Spreading modulation portion 30b of FIG. 17 uses a conventional transmission timing control device, as described in detail hereinafter.

FIG. 18 is a block diagram schematically showing a configuration of a main portion of spreading modulation portion 30b of FIG. 17. Spreading modulation portion 30b mainly includes a transmit data input terminal 101, a spreading portion 102, a timing control portion 103, a chip clock input terminal 104, a receive frame reference signal input terminal 105, a spreading code generation portion 106, and a transmit data output terminal 107.

Radio frame assembling portion 30c of FIG. 17 outputs transmit data which is in turn input through terminal 101 to spreading portion 102 at one input. Furthermore, spreading code generation portion 106 generates a spreading code which is in turn input to spreading portion 102 at the other input.

On the other hand, terminal 104 receives a chip clock which is applied to spreading code generation portion 106, spreading portion 102, and timing control portion 103.

In a CDMA system or any other similar digital radio communications a system is adopted to multiplex (or XOR) transmit data with a predetermined spreading code and transmit it and to allow a recipient side to use a despreading code to despread receive data.

FIG. 19 is timing plots schematically representing a principle of such a spreading process. With reference to FIGS. 18 and 19, transmit data provided to spreading portion 102 through terminal 101 is formed of symbols each serving as a basic unit of transmit data, as presented in FIG. 19(a). For the sake of convenience, Fs represents a frequency of a symbol clock defining the section of each symbol.

Spreading code generation portion 106 is timed in response to a chip clock applied through terminal 104, to generate a predetermined, spreading code sequence, as shown in FIG. 19(b). Note that a spreading code has a basic unit called a chip. For the sake of convenience, Fc represents a frequency of a chip clock defining the section of each chip.

Spreading portion 102 configured of an XOR circuit receives transmit data (FIG. 19(a)) and a spreading code (FIG. 19(b)) which are in turn mutually multiplexed (or XORed) at a timing as defined by a chip clock applied to spreading portion 102 through terminal 104 and a result thereof is output from spreading portion 102 as transmit data, as shown in FIG. 19(c), and received by timing control portion 103.

In general, symbol clock frequency Fs and chip clock frequency Fc has a relation represented by Fc=Fs×N, wherein n is also referred to as a spreading rate. In the FIG. 19 example, spreading rate N is four, although it is not limited thereto and it is selected within a range as determined by the specification of interest, as appropriate.

The transmit data spread by spreading portion 102 is received by timing control portion 103 formed for example of random access memory (RAM), a flip-flop or the like. As has been described previously, in CDMA digital radio communications a transmit signal is transmitted at a predetermined timing with reference to a timing of reception of a receive signal.

For example, TS25.211, a technical specification of the 3rd Generation Partnership Project (3GPP), a third generation mobile communication system, defines that a transmit signal be transmitted with a delay of a time corresponding to T0 (=1024) chips, as counted from a timing of reception of a receive signal.

For example, Japanese Patent Laying-Open No. 11-163766 (H04B 1/707) discloses a CDMA communication system controlling a timing for transmission of a transmit signal, as corresponding to such a definition.

FIG. 20 is timing plots schematically representing a relationship between such a timing of a receive signal and that of a transmit signal as described above. FIG. 20(a) represents a receive signal, which is sectioned by a frame having a length A for example of 10 milliseconds. Furthermore, FIG. 20(b) represents a transmit signal, which is also sectioned by a frame having a length B also for example of 10 milliseconds.

As has been described above, the transmit signal is transmitted after the receive signal is received when a predetermined period C elapses. (According to specification, period C corresponds for example to 1024 chips).

With reference again to FIG. 18, the transmit signal applied from spreading portion 102 to timing control portion 103 is transmitted through terminal 107 at a timing determined by counting a predetermined number of chip clocks 104 (T0=1024 chips for the above specification) applied through terminal 104 with reference to a receive frame reference signal received from a reception modem (not shown) included in mobile radio terminal modem 3a of FIG. 16 (or delayed by period C shown in FIG. 20).

Thus in conventionally controlling a timing for transmission a timing of reception of a receive signal is referenced and thereafter when a chip clock-based time of delay elapses a transmit signal is transmitted.

In digital radio communications a base station is provided with a predetermined clock frequency and so is a mobile radio terminal. However, for example an error of their respective crystal oscillators can gradually offset the frequencies. If this is not corrected, for example the mobile radio terminal would have a timing for transmission of a transmit signal gradually offset relative to a timing of reception of a receive signal.

Correcting such an offset entails adjusting a delay (T0=1024 chips for the above example) in timing for transmission relative to a timing of reception. If this is corrected by shifting a timing for transmission a minimal unit of timing-control or one clock of a chip clock, transmit data would be missing or overlap by one chip.

A conventional digital filter used in wave shaping portion 30a of FIG. 17 will now be described in detail.

In general, when digital data is limited in band it would have a blunt waveform resulting in inter-code interference.

A digital filter for limiting a band without such an inter-code interference is a well known Nyquist filter having Nyquist characteristics, transmission characteristics ideally free of inter-code interference so as to correctly reconstruct original data.

In reality, however, a frequency is hardly cut vertically and a roll-off filter having so-called roll-off characteristics is accordingly used to implement a Nyquist filter.

When an input signal is an impulse signal having an interval T the roll-off filter exhibits frequency characteristics, as represented by the following equation:

$$\begin{aligned} 0 & & 0 < f < (1-\alpha)/2T \\ 1/2\{1 - \sin(\pi/2\alpha)[(2fT) - (1-\alpha)]\} & & (1+\alpha)/2T < f < (1+\alpha)/2T \\ 1 & & f > (1+\alpha)/2T \end{aligned} \quad (1)$$

Furthermore, a root roll-off filter is also used, in which transmitting and recipient sides each use a digital filter having the frequency characteristics represented by equation (1) and together nulls inter-code interference.

The roll-off filter basically operates, as follows: it holds a number of tap coefficients for respective sampling points of a desired impulse response waveform for an impulse input, and input digital data are held by a shift register with a predetermined number of taps in accordance with a sampling period successively, while the data are multiplied by tap coefficients corresponding to their respective tap outputs and then summed up to provide a filter output.

Hereinafter will be described a configuration of a finite impulse response (FIR) filter as one example of a conventional digital roll-off filter.

FIG. 21 is a block diagram schematically showing a conventional FIR filter. Furthermore FIG. 22 represents an impulse response waveform of an FIR filter implementing Nyquist characteristics.

With reference to FIG. 21, input digital data is input for each sampling period Ts successively to a shift register 81 formed of cascade-connected delay elements $D_1$, $D_2$, $D_3$, ..., $D_n$ in n stages, wherein n represents a positive integer, and the data is delayed by sampling period Ts and thus held by respective delay elements in order. Respective stages of the shift register have their respective outputs, which together n tap outputs of the shift register.

Corresponding to the n tap outputs, n tap coefficients $\alpha_{0'}$, $\alpha_{1'}$, $\alpha_{2'}$, $\alpha_{3'}$, ..., $\alpha_{n}$ are previously held in a memory (not shown), the N tap coefficients $\alpha_{0'}$, $\alpha_{1'}$, $\alpha_{2'}$, $\alpha_{3'}$, ..., $\alpha_{n}$ corresponding to the values of n sampling points (not shown), respectively, of the predetermined impulse response waveform of FIG. 22.

Then in a sampling period when input digital data are held in the delay elements of the n stages forming the shift register the n tap outputs and the predetermined n tap coefficients $\alpha_{0'}$, $\alpha_{1'}$, $\alpha_{2'}$, $\alpha_{3'}$, ..., $\alpha_{n}$ are multiplied respectively, in a multiplication circuit 82 at corresponding n multipliers, respectively, and the resultant n multiplications are added gather by an addition circuit 83 and supplied as the current output of the digital filter.

Then in a subsequent sampling period the digital data held in the delay elements of the n stages are shifted to subsequent stages and in that state the n tap outputs and the predetermined n tap coefficients are multiplied and the resultant multiplications are added together, as described above.

Holding digital data in a shift register, multiplying tap outputs by tap coefficients, and adding the resultant multiplications together can thus be repeated in accordance with a sampling period to provide a digital filter output having inter-code interference free Nyquist characteristics based on the FIG. 22 impulse response waveform Note that if an input signal is a signal which is 1 or −1 and does not attain 0, i.e., a non-return-to-zero (NRZ) signal then it does not form a train of impulses of 0 or 1. If such an input signal is processed by a roll-off filter it is processed in such a method as described below:

More specifically, by previously converting an input NRZ signal to a normal impulse train and then providing it to the roll-off filter the aforementioned normal filtering process can be provided.

On the other hand, if an input NRZ signal is provided directly to the roll-off filter, the filter uses a tap coefficient corresponding to a value of a sampling point of an impulse response of the frequency characteristic of expression (1) that is multiplied by $\pi ft / \sin(\pi ft)$. The tap coefficient thus modified allows the NRZ signal to be filtered directly.

Such a digital roll-filter as described above that is associated with larger numbers of sampling points on an impulse response wave desired, i.e., larger numbers of tap coefficients can provide more ideal output waveforms. However, the shift register would accordingly have increased number of stages and furthermore the multiplication circuit and the addition circuit would also be increased in size.

SUMMARY OF THE INVENTION

Therefore, an object of the present invention is to provide a transmission timing control device capable of correcting an offset of a timing for transmission that is attributed to an offset between a clock of a base station and that of a terminal, without introducing missing, overlapping and the like of chip-based transmit data, and a mobile radio terminal including such a transmission timing control device.

Another object of the present invention is to provide a digital roll-off filter having a small circuit scale and still capable of providing an output waveform of high precision, and a mobile radio terminal using such a digital roll-off filter.

The present invention in one aspect provides a transmission timing control device controlling a timing of transmission of a transmit signal based on a timing of reception of a receive signal, including a first timing control portion, and a second timing control portion. The transmit signal is spread by a predetermined spreading code before transmission. The first timing control portion determines the timing of transmission of the transmit signal with the timing of reception of the receive signal serving as a reference timing, at temporal intervals defined by a first clock of a frequency of a chip serving as a basic unit of the spreading code. The second timing control portion adjusts at temporal intervals defined by a second clock of a frequency higher than the frequency of the first clock the timing of transmission determined by the first timing control portion.

The present invention in another aspect provides a mobile radio terminal for digital radio communication including a transmitting modem portion using a predetermined spreading code to spread a transmit signal, a radio processing portion subjecting the transmit signal spread by the transmitting modem portion to a radio process for transmission, and a control portion controlling a general operation of the mobile radio terminal. The transmitting modem portion includes a transmission timing control device controlling a timing of transmission of the transmit signal based on a timing of reception of a receive signal. The transmission timing control device including a first timing control portion and a second timing control portion. The first timing control portion determines the timing of transmission of the transmit signal with the timing of reception of the receive signal serving as a reference timing, at temporal intervals defined by a first clock of a frequency of a chip serving as a basic unit of the spreading code. The second timing control portion adjusts at temporal intervals defined by a second clock of a frequency higher than the frequency of the first clock the timing for transmission determined by the first timing control portion.

Thus in accordance with present invention a transmit signal once timed for transmission with reference to a timing of reception on a chip clock basin can be slightly adjusted by a temporal period shorter than the chip clock to correct an offset of a timing of transmission relative to a timing of reception without introducing missing, overlapping and the like of chip-based data.

The present invention instill another aspect provides a digital roll-off filter including a shift register, a memory, a counter, a predetermined number of tap coefficient selectors, a multiplication circuit, and an addition circuit. The shift register has a predetermined number of tap outputs and holds input digital data while delaying the input digital data in accordance with a data period sequentially. The memory holds tap coefficients respectively corresponding to sampling points set on a desired impulse response waveform having roll-off characteristics, the sampling point being of an oversampling period corresponding to 1/m of the data period, m being a positive integer. The counter operates to count in accordance with the oversampling period and reset in accordance with the data period. The tap coefficient selectors equal in number to the predetermined number of tap outputs are provided for the predetermined number of tap outputs, respectively. The counter outputs a value shared by the predetermined number of tap coefficient selectors. Each tap coefficient selector receives from the memory m tap coefficients corresponding to m sampling points included in the data period of the tap output corresponding thereto, each tap coefficient selector repetitively, sequentially selecting the m tap coefficients in response to the value output from the counter. The multiplication circuit provides respective multiplications of respective data of the predetermined number of tap outputs of the shift register by tap coefficients respectively selected by the predetermined number of tap coefficient selectors. The addition circuit adds the multiplications together for output as a filter output.

The present invention in still another aspect provides a digital roll-off filter including a shift register, a memory, a counter, a period variation detection circuit, a predetermined number of tap coefficient selectors, a multiplication circuit and an addition circuit. The shift register has a predetermined number of tap outputs and holds input digital data while delaying the input digital data in accordance with a data period sequentially. The memory holds tap coefficients respectively corresponding to sampling points set on a desired impulse response waveform having roll-off characteristics, the sampling point being of an oversampling period corresponding to 1/m of the data period, m being a positive integer, the memory also holding tap coefficients each corresponding to a point intermediate between the sampling points immediately adjacent and sandwiching a boundary of the data period. The counter operates to count in accordance with the oversampling period and reset in accordance with the data period. The period variation detection circuit detects variation in the data period in response to a maximal value output from the counter. The tap coefficient selectors equal in number to the predetermined number of tap outputs are provided for the predetermined number of tap outputs, respectively. The counter outputs a value shared by the predetermined number of tap coefficient selectors, and the period variation detection circuit outputs a detection output shared by the predetermined number of tap coefficient selectors. Each tap coefficient selector receives from the memory m tap coefficients corresponding to m sampling points included in the data period of the tap output corresponding thereto and the tap coefficient corresponding to the point intermediate between the sampling points immediately adjacent and sandwiching the boundary of the data period, each tap coefficient selector repetitively, sequentially selecting the m tap coefficients in response to the value output from the counter, and when the period variation detection circuit detects variation in the data period each tap coefficient selector further selects the tap coefficient of the point intermediate between the successive sampling points preceding and following the variation to interpolate the coefficient before and after the variation. The multiplication circuit provides respective multiplications of respective data of the predetermined number of tap outputs of the shift register by tap coefficients respectively selected by the predetermined number of tap coefficient selectors. The addition circuit adds the multiplications together for output as a filter output.

The present invention still another aspect provides a digital roll-off filter including a plurality of filter circuits and a coefficient select circuit. The plurality of filter circuits respectively, correspondingly receives a plurality of types of input digital data. The coefficient select circuit is shared by the plurality of filter circuits. Each of the plurality of filter circuits includes a shift register having a predetermined number of tap outputs and holding corresponding the input digital data while delaying the corresponding input digital data in accordance with a data period sequentially. The coefficient select circuit includes a memory, a counter and a predetermined number of tap coefficient selectors. The memory holds tap coefficients respectively corresponding to sampling points set on a desired impulse response waveform having roll-off characteristics, the sampling point being of an oversampling period corresponding to 1/m of the data period, m being a positive integer. The counter operates to count in accordance with the oversampling period and reset in accordance with the data period. The tap coefficient selectors equal in number to the predetermined number of tap outputs are provided for the predetermined number of tap outputs, respectively. The counter outputs a value shared by the predetermined number of tap coefficient selectors. Each tap coefficient selector receives from the memory m tap coefficients corresponding to m sampling points included in the data period of the tap output corresponding thereto, each tap coefficient selector repetitively, sequentially selecting the m tap coefficients in response to the value output from the counter. The predetermined number of tap coefficient selectors thus respectively selects tap coefficients shared by the plurality of filter circuits. The plurality of filter circuits further including a multiplication circuit and an addition circuit. The multiplication circuit provides respective multiplications of respective data of the predetermined number of tap outputs of the shift register corresponding thereto by tap coefficients respectively selected by the predetermined number of tap coefficient selectors. The addition circuit adds the multiplications together for output.

The present invention in still another aspect provides a mobile radio terminal for digital radio communication including a transmitting modem portion modulating transmit digital data, and a radio processing portion subjecting a transmit output of the transmitting modem portion to a radio process for transmission. The transmitting modem portion includes a digital roll-off filter for limiting a transmission band of the transmit digital data, the digital roll-off filter including a shift register, a memory, a counter, a predetermined number of tap coefficient selectors, a multiplication circuit and an addition circuit. The shift register has a predetermined number of tap outputs and holds input digital data while delaying the input digital data in accordance with a data period sequentially. The memory holds tap coefficients respectively corresponding to sampling points set on a desired impulse response waveform having roll-off characteristics, the sampling point being of an oversampling period corresponding to 1/m of the data period, m being a positive integer. The counter operates to count in accordance with the oversampling period and reset in accordance with the data period. The tap coefficient selectors equal in number to the predetermined number of tap outputs are provided for the predetermined number of tap outputs, respectively. The counter outputs a value shared by the predetermined number of tap coefficient selectors. Each tap coefficient selector receives from the memory m tap coefficients corresponding to m sampling points included in the data period of the tap output corresponding thereto, each tap coefficient selector repetitively, sequentially selecting the m tap coefficients in response to the value output from the counter. The multiplication circuit providing respective multiplications of respective data of the predetermined number of the tap outputs of the shift register by tap coefficients respectively selected by the predetermined number of tap coefficient selectors. The addition circuit adds the multiplications together for output as a filter output.

The present invention in still another aspect provides a mobile radio terminal for digital radio communication including a transmitting modem portion modulating transmit digital data, and a radio processing portion subjecting a transmit output of the transmitting modem portion to a radio process for transmission. The transmitting modem portion includes a digital roll-off filter for limiting a transmission band of the transmit digital data, the digital roll-off filter including a shift register, a memory, a counter, a period variation detection circuit, a multiplication circuit and an addition circuit. The shift register has a predetermined number of tap outputs and holds input digital data while delaying the input digital data in accordance with a data period sequentially. The memory holds tap coefficients respectively corresponding to sampling points set on a desired impulse response waveform having roll-off characteristics, the sampling point being of an oversampling period corresponding to 1/m of the data period, m being a positive integer, the memory also holds tap coefficients each corresponding to a point intermediate between the sampling points immediately adjacent and sandwiching a boundary of the data period. The counter operates to count in accordance with the oversampling period and reset in accordance with the data period. The period variation detection circuit detects variation in the data period in response to a maximal value output from the counter. The tap coefficient selectors equal in number to the predetermined number of tap outputs are provided for the predetermined number of tap outputs, respectively. The counter outputs a value shared by the predetermined number of tap coefficient selectors, and the period variation detection circuit outputs a detection output shared by the predetermined number of tap coefficient selectors. Each tap coefficient selector receives from the memory m tap coefficients corresponding to m sampling points included in the data period of the tap output corresponding thereto and the tap coefficient corresponding to the point intermediate between the sampling points immediately adjacent and sandwiching the boundary of the data period, each tap coefficient selector repetitively, sequentially selecting the m tap coefficients in response to the value output from the counter, and when the period variation detection circuit detects variation in the data period each tap coefficient selector further selects the tap coefficient of the point intermediate between the successive sampling points preceding and following the variation to interpolate the coefficient before and after the variation. The multiplication circuit provides respective multiplications of respective data of the predetermined number of tap outputs of the shift register by tap coefficients respectively selected by the predetermined number of tap coefficient selectors. The addition circuit adds the multiplications together for output as a filter output.

The present invention is still another aspect provides a mobile radio terminal for digital radio communication including a transmitting modem portion modulating transmit digital data, and a radio processing portion subjecting a transmit output of the transmitting modem portion to a radio process for transmission. The transmitting modem portion includes a digital roll-off filter for limiting a transmission band of the transmit digital data, the digital roll-off filter including a plurality of filter circuits and a coefficient select circuit. The plurality of filter circuits respectively, correspondingly receives a plurality of types of input digital data. The coefficient select circuit is shared by the plurality of filter circuits. Each of the plurality of filter circuits includes a shift register having a predetermined number of tap outputs and holding corresponding input digital data while delaying the corresponding input digital data in accordance with a data period sequentially. The coefficient select circuit includes a memory, a counter, and a predetermined number of tap coefficient selectors. The memory holds tap coefficients respectively corresponding to sampling points set on a desired impulse response waveform having roll-off characteristics, the sampling point being of an oversampling period corresponding to 1/m of the data period, m being a positive integer. The counter operates to count in accordance with the oversampling period and reset in accordance with the data period. The tap coefficient selectors equal in number to the predetermined number of tap outputs are provided for the predetermined number of tap outputs, respectively. The counter outputs a value shared by the predetermined number of tap coefficient selectors. Each tap coefficient selector receives from the memory m tap coefficients corresponding to m sampling points included in the data period of the tap output corresponding thereto, each tap coefficient selector repetitively, sequentially selecting the m tap coefficients in response to the value output from the counter. The predetermined number of tap coefficient selectors thus respectively selecting tap coefficients shared by the plurality of filter circuits. The plurality of filter circuits further includes a multiplication circuit and an addition circuit. The multiplicataion circuit provides respective multiplications of respective data of the predetermined number of tap outputs of the shift register corresponding thereto by tap coefficients respectively selected by the predetermined number of tap coefficient selectors. The addition circuit adds the multiplications together for output.

Thus, in the present invention, input digital data is held by a data period in a shift register, while in response to a counter output value counted in accordance with an oversampling period of 1/m and reset in accordance with the data period tap coefficients corresponding to m sampling points included in the data period for each tap output of the shift register are selected iteratively in order and used to multiply the tap outputs. The input digital data that has been input to the shift register in accordance with a sampling period can thus equivalently be represented with 1/m-stage shift register. Thus a reduced circuit configuration can be used to obtain a filter output waveform of high precision.

Furthermore, if the data period varies, selecting a tap coefficient of a point intermediate between successive sampling points adjacent and preceding and following the variation can interpolate tap coefficient preceding and following the variation and thus prevent the digital roll-filter from having impaired frequency characteristics.

Furthermore, if it is necessary to provide a plurality of identically configured filter circuits for a plurality of types of input digital data, such as when transmit digital data has been complex-spread by a spreading code, a circuit for selecting a tap coefficient can be extracted from each filter circuit to provide a single circuit commonly so that a significantly simplified circuit configuration can thus be achieved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
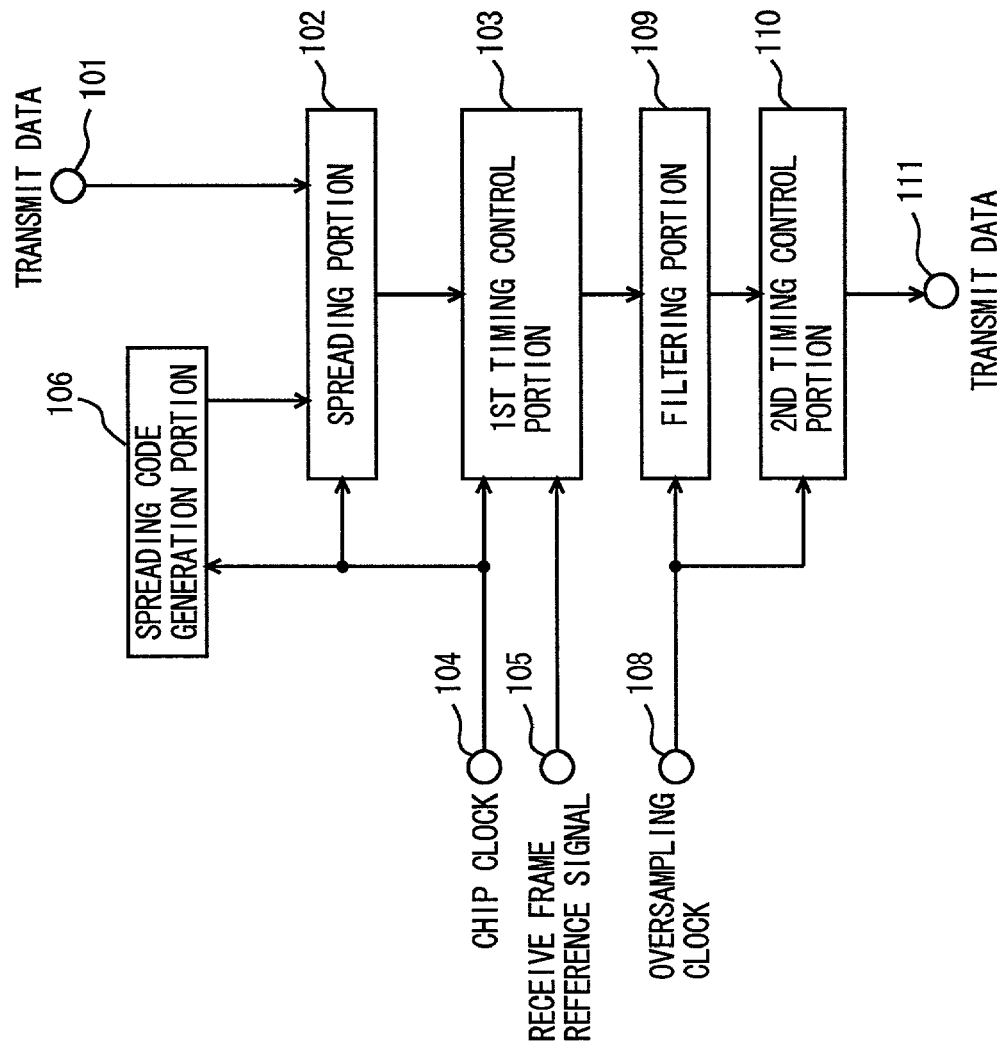
FIG. 1 is a block diagram schematically showing a configuration of a transmitting modem including a transmission timing control device of the present invention in a first embodiment.

Hereinafter the present invention in embodiments will be described with reference to the drawings more specifically. Note that in the figures, a like components are denoted by a like reference characters.

First Embodiment

FIG. 1 is a block diagram schematically showing a configuration including a transmission timing control device of the present invention in a first embodiment and more specifically it is a block diagram schematically showing a configuration of a main portion of a spreading modulation portion 30b and a waveform shaping portion 30a configuring a transmitting modem portion (corresponding to a reference numeral 30 in FIG. 17) of a mobile radio terminal. Note that excluding spreading modulation portion 30b and waveform shaping portion 30a described hereinafter, the mobile radio terminal is configured identical to that described with reference to FIGS. 16 and 17. Therefore, the description of the identified portion will not be repeated.

Figure 18:
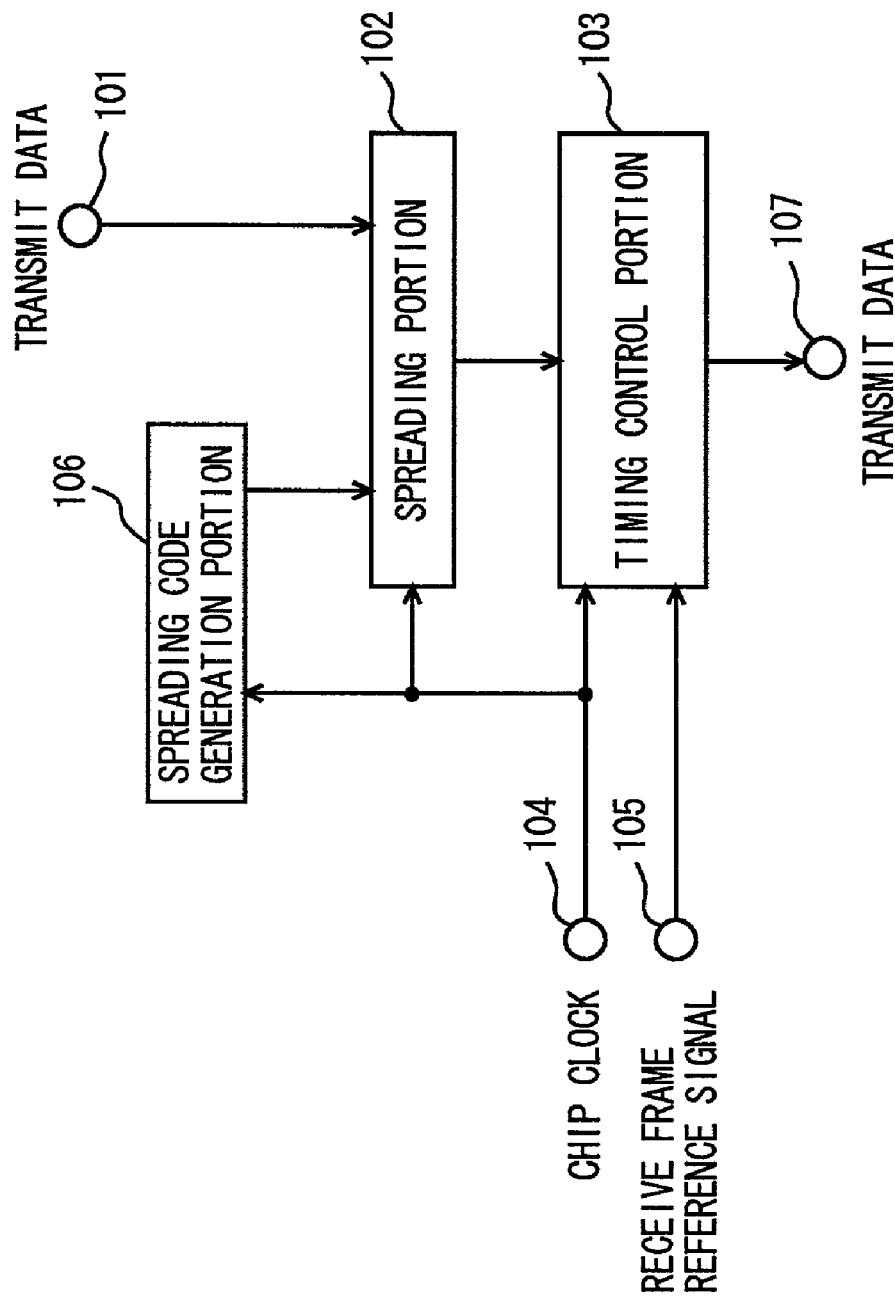
FIG. 18 is a block diagram schematically showing a configuration of a main portion of spreading modulation portion 30b shown in FIG. 17.
Figure 19:
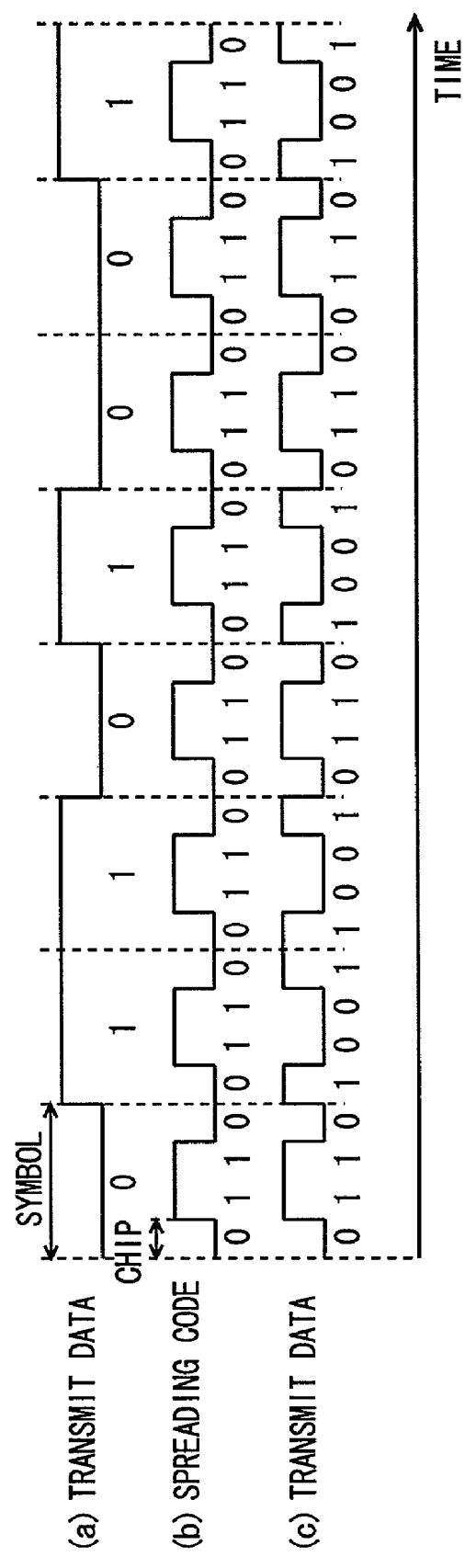
FIG. 19 is timing plots schematically representing a principle of a spreading process.
Figure 20:
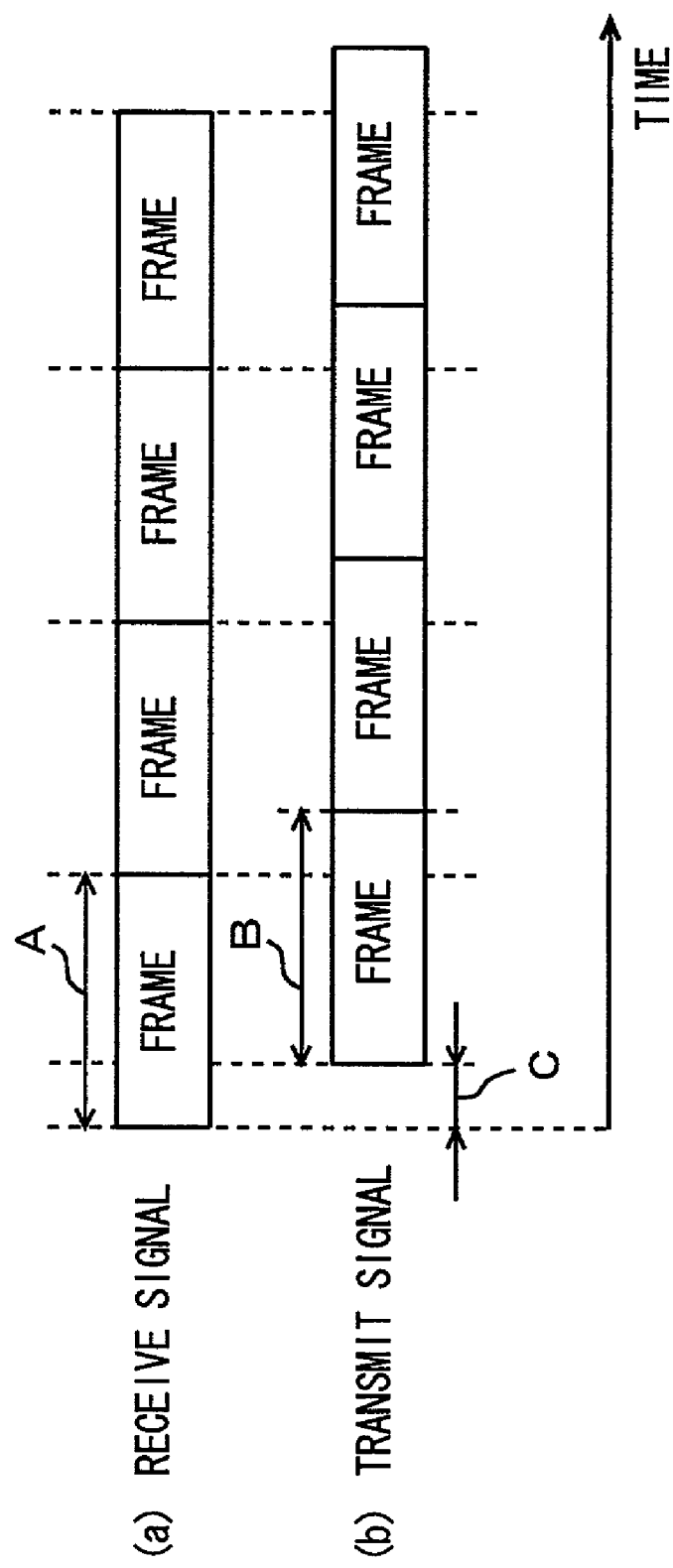
FIG. 20 is timing plots schematically representing a relationship between a timing of a receive signal and that of a transmit signal.

Of the FIG. 1 configuration, a transmit data input terminal 101, a spreading portion 102, a first timing control portion 103, a chip clock input terminal 104, a receive frame reference signal input terminal 105, and a spreading code generation portion 106 are as described with reference to the FIG. 18 conventional example, configuring spreading modulation portion 30b, and operate, as has been described with reference to FIGS. 18–20 in detail. Therefore, the description will not be repeated here.

Note that spreading-modulation may precedes timing-control or vice versa, and spreading portion 102 may be preceded by the first timing control portion 103 and for transmit data controlled in timing, a spreading code may be multiplexed in synchronization with a chip clock.

Figure 17:
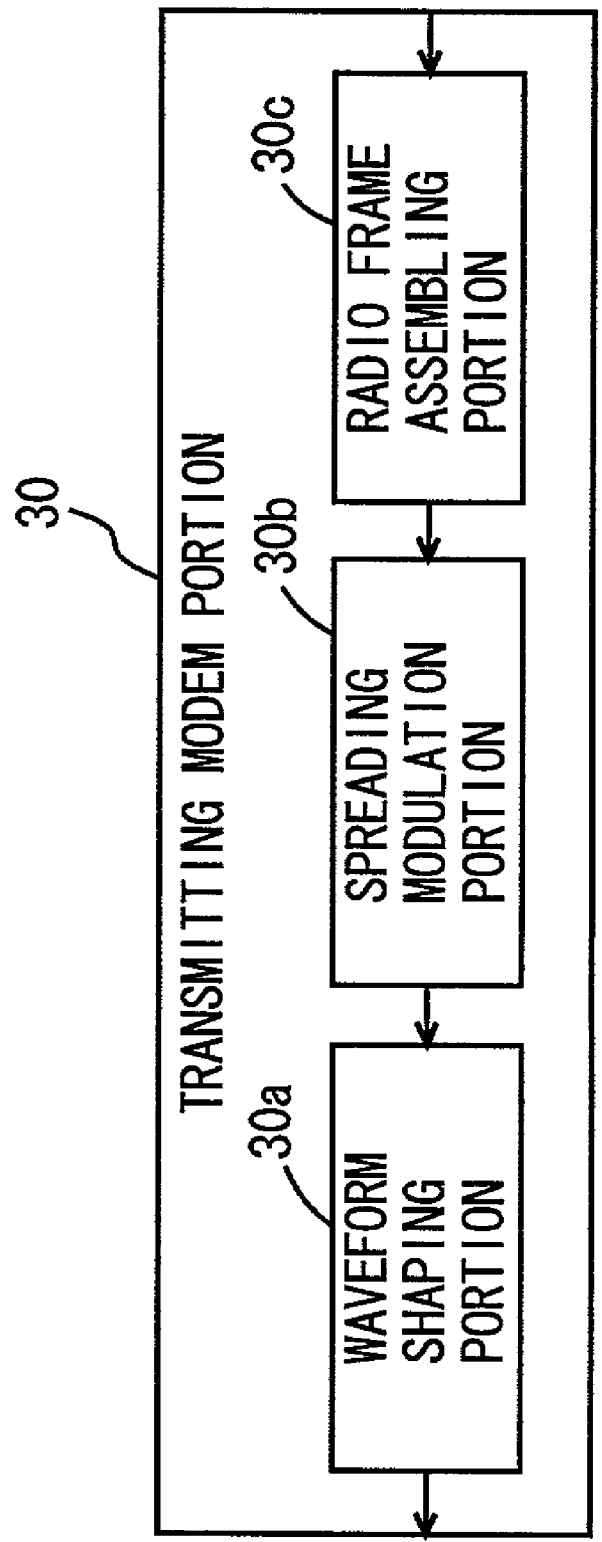
FIG. 17 is a block diagram schematically showing a transmitting modem portion in the FIG. 16 mobile radio terminal.

Furthermore with reference to FIG. 1 an oversampling clock input terminal 108, a filtering portion 109, a second timing control portion 110 and a transmit data output terminal 111 configure a main portion of waveform shaping portion 30a of transmitting modem portion 30 shown in FIG. 17.

As has been described previously in conjunction with FIG. 20, the first timing control portion 103 times a transmit signal to transmit it when a predetermined, chip-clock based interval T0 (=1024 chips) elapses, as counted from a timing of reception of a receive signal that is indicated by a receive frame reference signal.

The transmit signal thus timed for transmission is provided to filtering portion 109 acting as a core of waveform shaping portion 30a. Filtering portion 109 includes a digital filter and shapes a waveform to limit a transmission band of a transmit signal spread-modulated by spreading portion 102.

Figure 2:
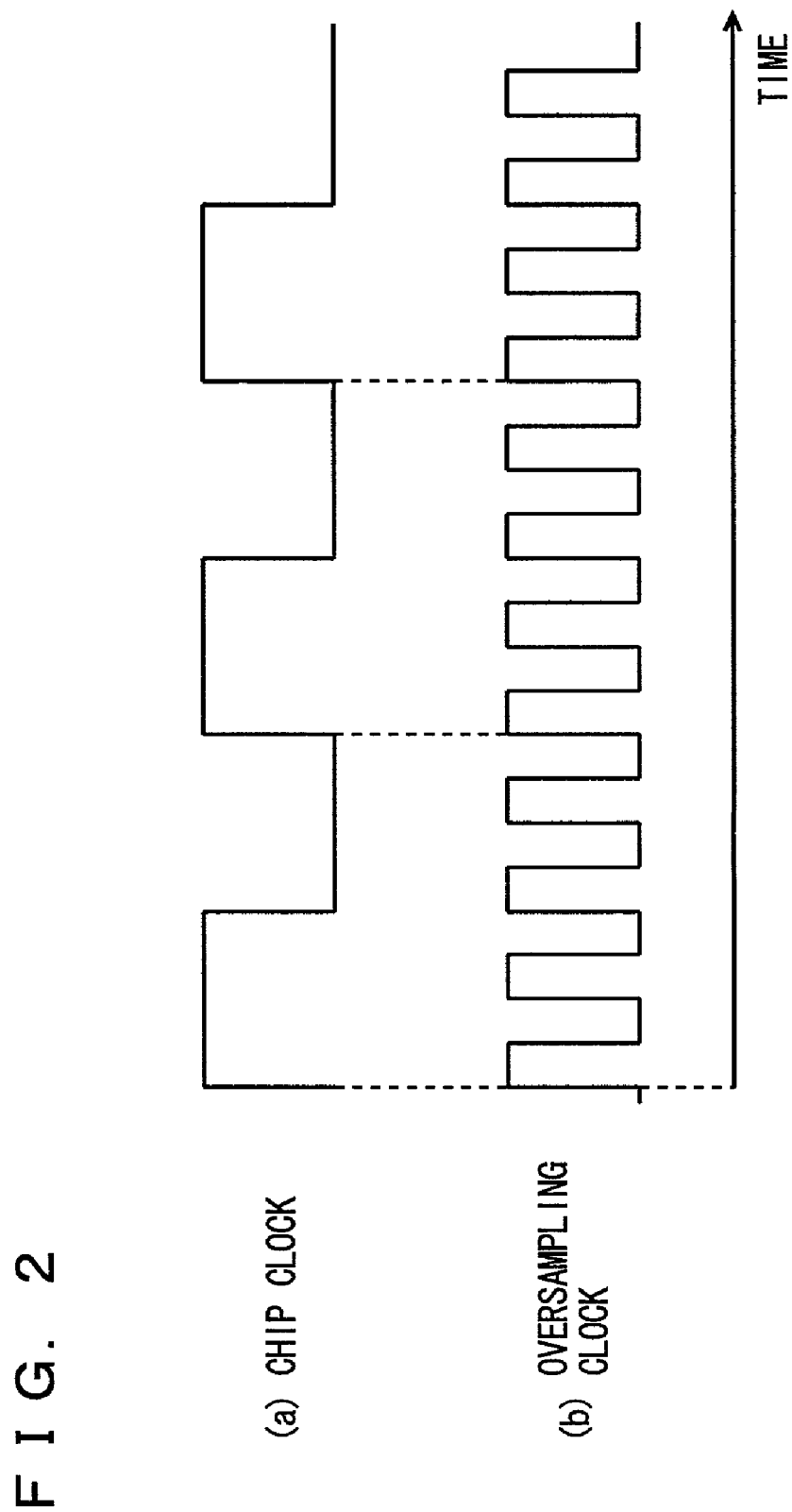
FIG. 2 is timing plots representing a relationship between a chip clock and an oversampling clock.

In general, in a digital filter used in filtering portion 109 sampling points on an impulse response waveform are interpolated in fine manner. Thus a frequency higher than that of the chip clock, for example in the present embodiment an oversampling clock having a frequency four times the chip clock is used. FIG. 2 is timing plots representing a relationship between a chip clock and an oversampling clock in the present embodiment. Note that the clock of a quadruple frequency as shown in FIG. 2(b) may serve as a system clock and by an enable signal pulse (not shown) having one fourth of the frequency and activated in synchronization with the system clock for a length corresponding to one clock of the system clock the chip clock of FIG. 2(a) may be substituted.

Filtering portion 109 provides filtering in response to such an oversampling clock as applied through terminal 108 and provides a filter output waveform to the second timing control portion 110.

The oversampling clock applied through terminal 108 is also applied to the second timing control portion 110, which times the filtered transmit signal with a fine adjustment based on the unit time of the oversampling clock.

Figure 3:
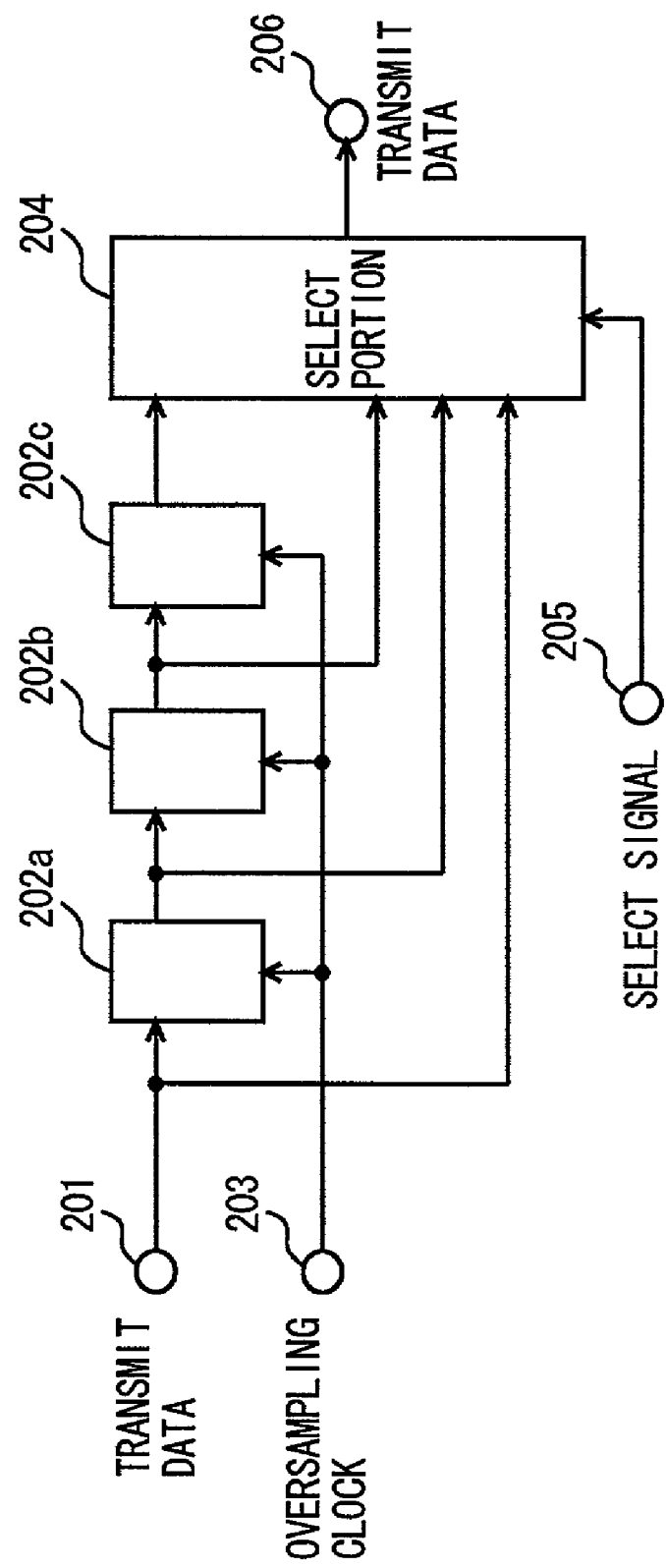
FIG. 3 is a block diagram showing a configuration of a second timing control portion 110 shown in FIG. 1.

FIG. 3 is a block diagram showing a specific configuration of the second timing control portion 110 shown in FIG. 1. The second timing control portion 110 mainly includes cascade-connected, three stages of flip-flops 202a, 202b, 202c, and a select portion 204.

With reference to the figure, an oversampling clock applied through terminal 108 of FIG. 1 is applied through a terminal 203 to the three stages of flip-flops 202a, 202b, 202c and the flip-flops delay received signals successively for a period corresponding to a one clock of the oversampling clock.

On the other hand, a transmit signal provided from filtering portion 109 of FIG. 1 is input through a terminal 201 to the initial stage of flip-flop 202a and also to select portion 204 at a first input.

The initial stage of flip-flop 202a delays the transmit signal for a period corresponding to one clock of the oversampling clock and then provides it to the subsequent stage of flip-flop 202b and also to select portion 204 at a second input.

The second stage of flip-flop 202b further delays the transmit signal for the period corresponding to one clock of the oversampling clock and then provides it to the subsequent stage of flip-flop 202c and also to select portion 204 at a third input.

The third stage of flip-flop 202c further delays the transmit signal for the period corresponding to one clock of the oversampling clock and then provides it to select portion 204 at a fourth input.

That is, select portion 204 has first to fourth inputs receiving in parallel transmit signals delayed successively at intervals corresponding to the unit time of the oversampling clock or one fourth the chip clock.

Figure 16:
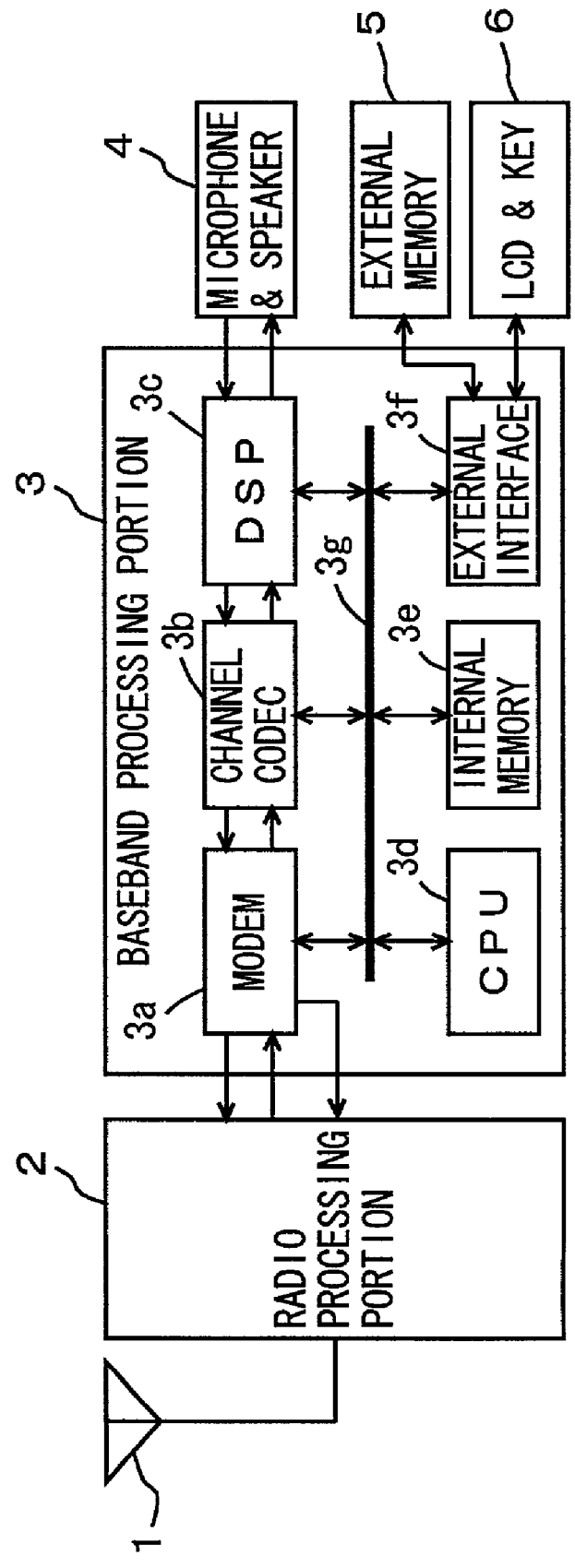
FIG. 16 is a schematic block diagram of a mobile radio terminal for digital radio communication.

Select portion 204 further receives through a terminal 205 from CPU 3d shown in the general configuration of the FIG. 16 mobile radio terminal a select signal selecting any of the four input signals.

CPU 3d monitors a phase (or timing) shift of a transmit signal relative to a receive signal on the terminal's side that is attributed for example to an offset between a clock of a base station and that of the terminal. When CPU 3d detects a phase shift, it selects from the four inputs an input (a transmit signal) having an amount of delay compensating for the phase shift.

As a result, select circuit 204 outputs through a terminal 206 a transmit signal having timed for transmission with a fine adjustment based on the unit time corresponding to one fourth of the chip clock.

An amount of delay once determined by a select signal, i.e., an selection by select circuit 204 of an output of a flip-flop is exactly maintained, and whenever CPU 3d again detects a phase shift a timing for transmission undergoes a fine adjustment, as described above, to change the current selection of the output of the flip-flop.

Note that the first embodiment employs an oversampling clock four times in frequency a chip clock. Accordingly, three stages of flip-flops are used to divide the unit time of the chip clock in four and from the resultant, transmit signal having four different timings, that having an appropriate amount of delay is selected. Generally, if an oversampling clock is N times a chip clock in frequency, (N−1) stages of flip-flops are used to divide the unit time of the chip clock in N and from the resultant, transmit signal having N different timings a transmit signal is selected.

Thus, in the first embodiment, if for example an offset between a clock of a base station and that of a terminal contributes to an offset of a timing for transmission relative to a timing of reception, a transmission signal once timed by the first timing control portion 103 for transmission with reference to the timing of the reception with a chip clock serving as a unit time, can undergo a fine adjustment in second timing control portion 110 with an oversampling clock, shorter than the chip clock, serving as a unit time to correct in a mobile radio terminal an offset of the timing of transmission relative to the timing of reception without missing, overlapping or the like of chip-based data.

Second Embodiment

Hereinafter will be described an embodiment of the digital roll-off filter of the present invention used in waveform shaping portion 30a of FIG. 17.

Figure 4:
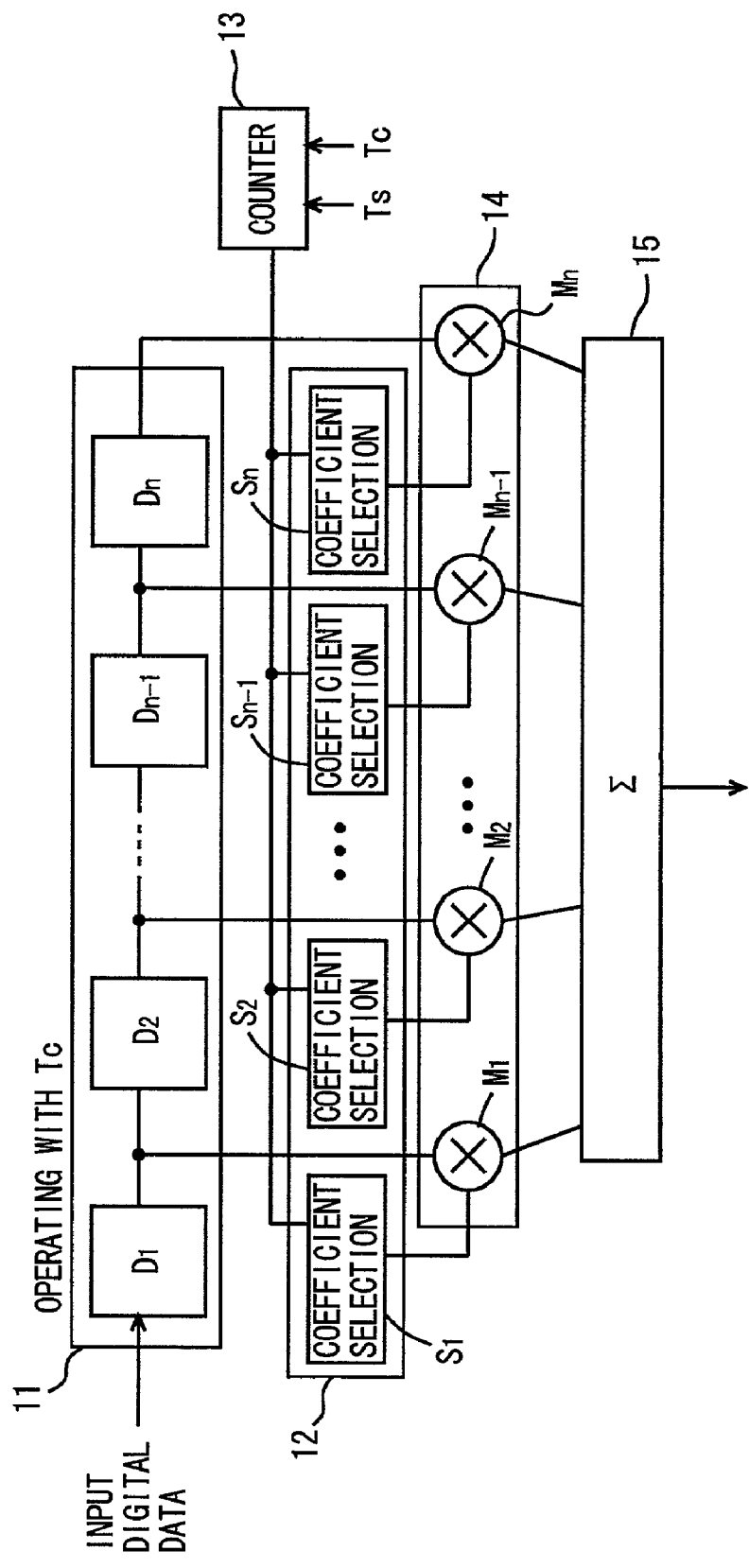
FIG. 4 is a block diagram showing a configuration of a digital roll-off filter of the present invention in a second embodiment.

FIG. 4 is a block diagram showing a configuration of the digital roll-off filter of the present invention in a second embodiment. This digital roll-off filter is implemented as an FIR filter.

With reference to FIG. 4, input digital data are input successively for each data period Tc to a shift register 11 formed of cascade-connected, n stages of delay elements $D_1$, $D_2$, ..., $D_n$ wherein n is a positive integer, and the data are delayed by data period Tc and thus held by respective delay elements sequentially. The stages of the shift register have their respective outputs forming n tap outputs of the shift register.

Figure 21:
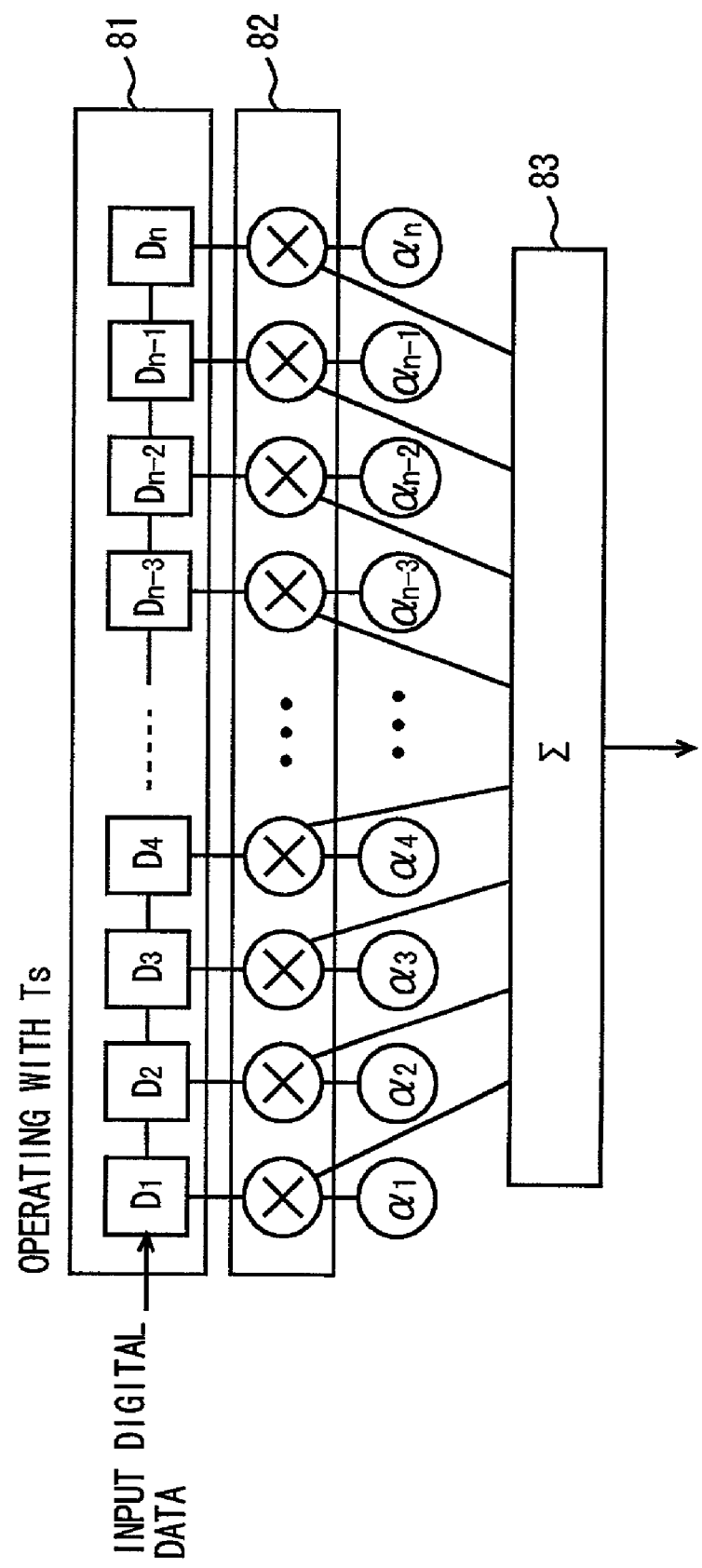
FIG. 21 is a block diagram showing a configuration of a conventional FIR filter.
Figure 22:
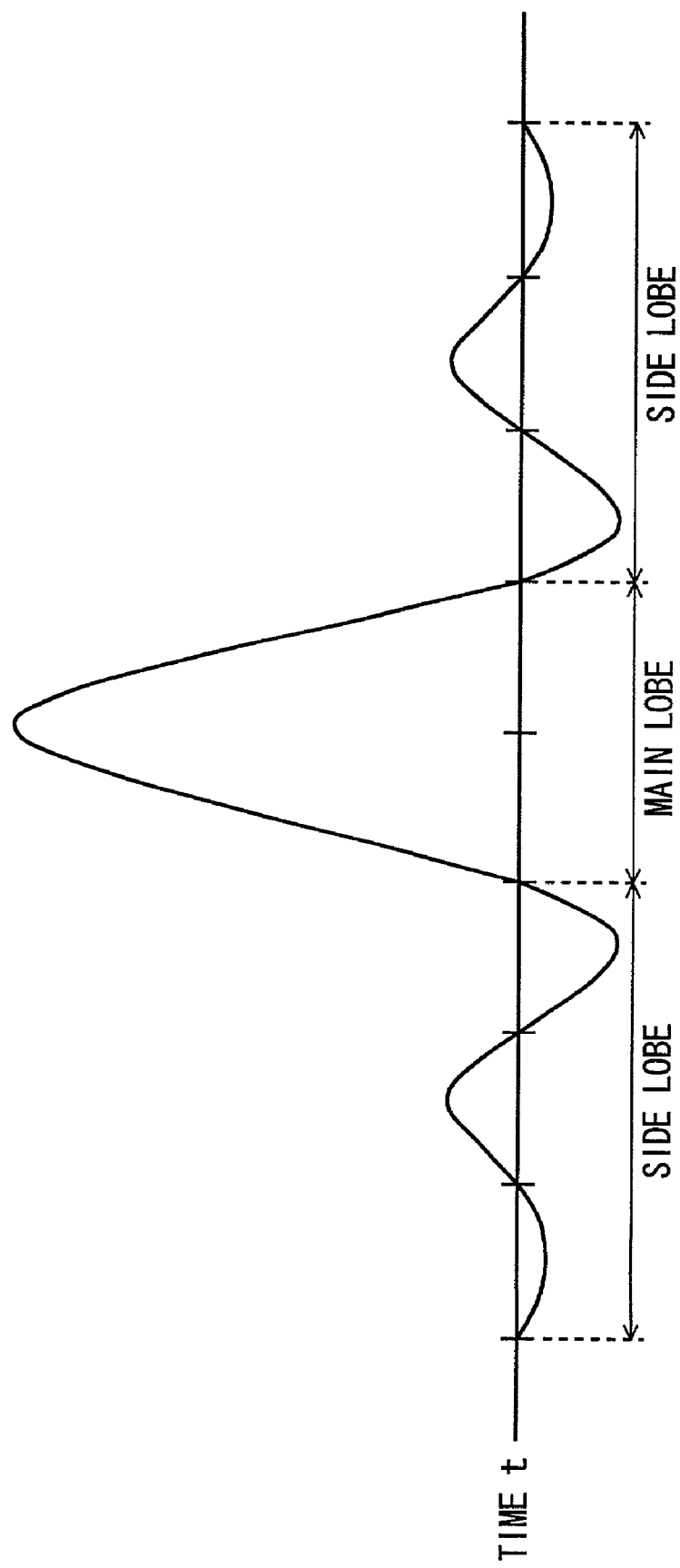
FIG. 22 is a waveform diagram representing an impulse response waveform having Nyquist characteristics.

The second embodiment is different from the conventional FRI filter of FIG. 21 in that in the former, data is input and delayed in accordance with data period Tc, whereas in the latter, data is input and delayed in accordance with sampling period Ts.

Counter 13 operates receiving for example a clock of data period Tc reproduced from a receive signal and an internal clock of an oversampling period Ts corresponding to 1/m of period Tc, wherein m is a positive integer. These clocks are supplied for example from CPU 3d of FIG. 16. Counter 13 counts in response to these clocks in accordance with oversampling period Ts and is reset in accordance with data period Tc.

A coefficient select circuit 12 includes coefficient selectors $S_1$, $S_2$, ..., $S_n$. Counter 13 outputs a value which is in turn provided to coefficient selectors $S_1$, $S_2$, ..., $S_n$ of the coefficient select circuit 12 commonly.

Figure 5:
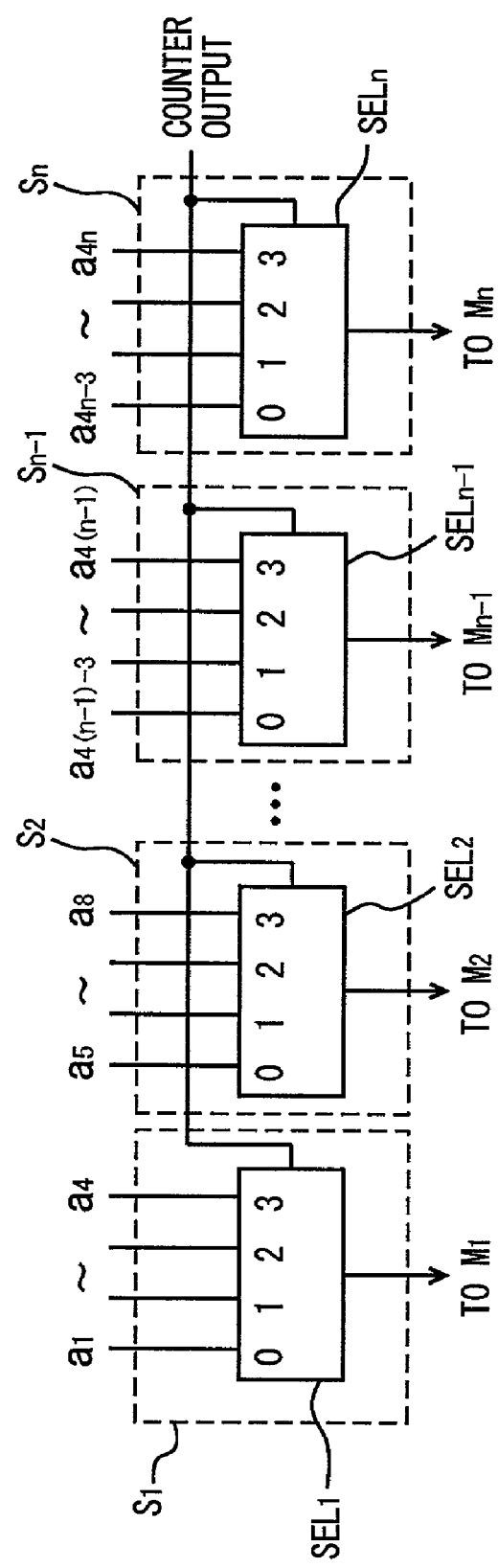
FIG. 5 is a block diagram showing a configuration of a coefficient select circuit shown in FIG. 4.
Figure 6:
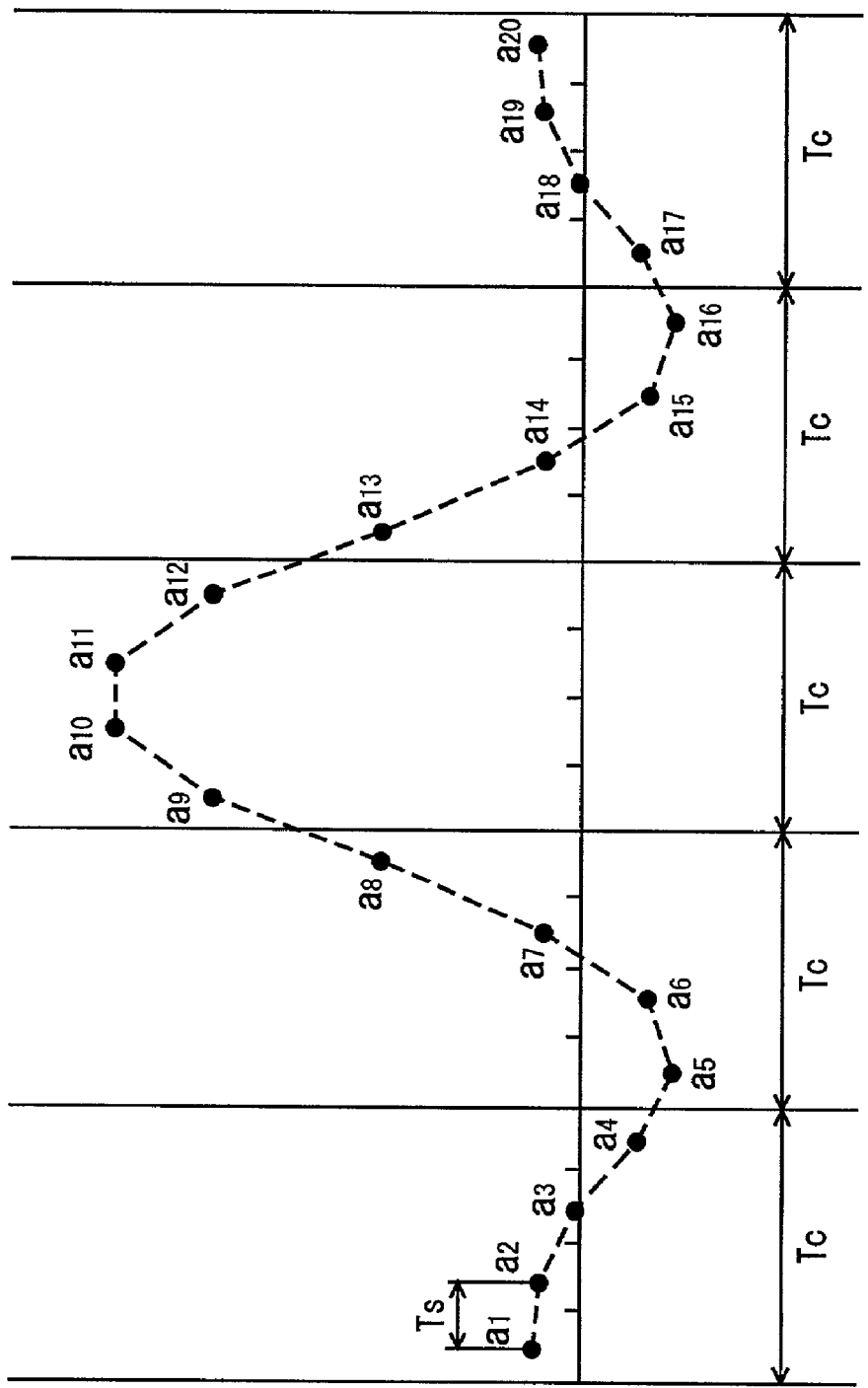
FIG. 6 schematically represents a manner of sampling on an impulse response waveform in the second embodiment.

FIG. 5 is a block diagram showing a configuration of coefficient select circuit 12 shown in FIG. 4. FIG. 6 schematically shows a manner of sampling on an impulse response waveform in the present embodiment.

With reference to FIG. 6 in the second embodiment an impulse response waveform is divided by data period Tc and each data period Tc is divided by oversampling period Ts by an integer m, which is equal to four in the following example. For example in the FIG. 6 example an impulse response waveform corresponding to data period Tc×5 has thereon sampling points a1–a20 set in accordance with oversampling period Ts and within each data period Tc four sampling points are allocated.

Corresponding to the values of these sampling points, tap coefficients are previously stored in a memory (not shown), e.g., internal memory 3e of FIG. 16.

With reference to FIG. 5, tap coefficients (hereinafter referred to as a1–a4) corresponding to sampling points a1–a4 are read from the memory and provided to coefficient selector $S_1$ and received by a selector $SEL_1$ at inputs 0–3, respectively.

Furthermore, tap coefficients (hereinafter a5–a8) corresponding to sampling points a5–a8 are read from the memory and provided to coefficient selector $S_2$ and thus received by a selector $SEL_2$ at inputs 0–3, respectively.

Similarly, tap coefficients (hereinafter a4(n−1)−3 to a4(n−1) corresponding to sampling points a4(n−1)−3 to a4(n−1) are read from the memory and provided to coefficient selector $S_{n-1}$ and thus received by selector $SEL_{n-1}$ at inputs 0–3, respectively.

Finally, tap coefficients (hereinafter a4n−3 to a4n) corresponding to sampling points a4n−3 to a4n are read from the memory and provided to coefficient selector $S_n$ and thus received by selector $SEL_n$ at inputs 0–3, respectively.

Counter 13 outputs a value which is in turn input to selectors $SEL_1$ to $SEL_n$ at their respective control inputs commonly. In response to the control input, each selector switches four inputs 0–3 in accordance with sampling period Ts sequentially for selection and output.

With reference again to FIG. 4, selectors $SEL_1$ to $SEL_n$ have their respective outputs (tap coefficients) provided to multiplication circuit 14 and received by corresponding multipliers $M_1$–$M_n$ at their respective one inputs. Multipliers $M_1$–$M_n$ have their respective other inputs receiving data (tap outputs) held by corresponding delay elements $D_1$–$D_n$ of shift register 11.

Multipliers $M_1$ to $M_n$ effect their respective multiplications which are in turn added together by an addition circuit 15 and the resultant sum is output from the digital roll-off filter as a filter output.

Figure 7:
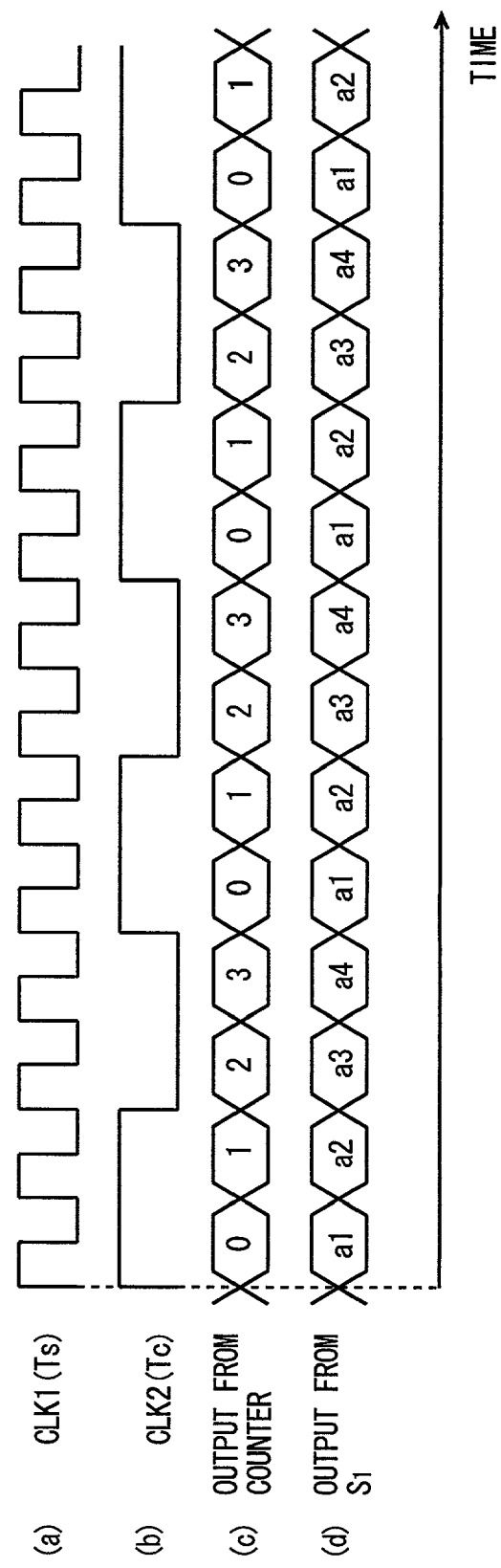
FIG. 7 is timing plots representing an operation of the digital roll-off filter in the second embodiment.

FIG. 7 is timing plots representing an operation of the digital roll-off filter in the second embodiment. Reference will now be made to FIGS. 4–7 to describe an operation of the digital roll-off filter in the second embodiment.

As has been described above, counter 13 receives a clock (CLK1) of sampling period Ts shown in FIG. 7(a) and a clock (CLK2) corresponding to data period Tc of a quadruple frequency shown in FIG. 7(b). Counter 13 counts in response to clock CLK1 and is reset in response to clock CLK2.

Counter 13 thus outputs a value repeating 0, 1, 2 and 3, as shown in FIG. 7(c). This output value is shared by selectors $SEL_1$~$SEL_n$ commonly, and for example selector $SEL_1$ (coefficient selector $S_1$) provides an output, as shown in FIG. 7(d).

More specifically, in response to a counter output value of zero, tap coefficient a1 corresponding to sampling point a1 is selected and output, and similarly in response to counter output values of 1, 2 and 3, tap coefficients a2, a3 and a4 corresponding to sampling points a2, a3 and a4, respectively, are selected and output, respectively. In response to the counter output value repeating, the selector also repeats the aforementioned select operation.

The other selectors similarly operate and repeat sequential selection of tap coefficients corresponding to the four sampling points within their corresponding data periods Tc.

For example selector $SEL_2$ responds to the counter output value of 0 by selecting and outputting tap coefficient a5 corresponding to sampling point a5. Similarly it responds to the counter output values of 1, 2 and 3 by respectively selecting and outputting tap coefficients a6, a7 and a8 respectively corresponding to sampling points a6, a7 and a8.

Furthermore selector $SEL_n$ responds to the counter output value of 0 by selecting and outputting tap coefficient a4$n$−3 corresponding to sampling point a4$n$−3. Similarly, it responds to the counter output values of 1, 2 and 3 by respectively selecting and outputting tap coefficients a4$n$−2, a4$n$−1 and a4$n$ respectively corresponding to sampling points a4$n$−2, a4$n$−1 and a4$n$. In the digital roll-off filter of the second embodiment a multiplication of a tap coefficient and a corresponding tap output is effected in accordance with sampling period Ts, similarly as described with reference to FIG. 21 conventional example, by selecting a tap coefficient in response to a counter output value of counter 13.

More specifically in the second embodiment (for m=4) shift register 11 has each delay element holding data for data period Tc, during which a coefficient selector corresponding to each delay element can switch between four tap coefficients in accordance with data period Tc divided by four or sampling period Ts, and as a result a filter output can be of roll-off characteristics with the same precision as the conventional example.

On the other hand, the shift register can have a number of stages that is reduced to one fourth of the conventional example. More specifically in the second embodiment the shift register is driven in accordance with data period Tc of a quadruple period and accordingly each delay element holds data for a period corresponding to four times that of the conventional example and the number of delay elements required is also reduced to one fourth.

More specifically, if the number, 4$n$, of tap coefficients of the digital roll-off filter of the second embodiment shown in FIG. 4 is equal to the number, n, of tap coefficients of the FIG. 21 conventional example, the number, n, of stages of shift register 11 of the former is ¼, more generally, 1/m the number, n, of stages of shift register 81 of the latter.

Thus in the second embodiment the digital roll-off filter allows input digital data to be held in accordance with data period Tc by a shift register successively, while in response to a counter output value counted and reset in accordance with oversampling period Ts (1/m (for example ¼) of data period Tc) and data period Tc, respectively, it effects repetitive, sequential selection of tap coefficients corresponding to m sampling points included in the data period, for each tap output of the shift register, and provides the same for multiplication with the tap output of interest.

Thus a shift register having 1/m stage can be used to implement a filter equivalent to a conventional digital roll-off filter holding input digital data in accordance with sampling period Ts at a shift register. A reduced circuit configuration can thus be used to obtain a filter output waveform of high precision.

Third Embodiment

If clock CLK2 of data period Tc is a clock reproduced for example from a receive signal, period Tc can be offset, normally by a width of approximately ±Ts, which, in this case, would invite impaired frequency characteristics of the digital roll-off filter.

For example, if data period Tc is reduced to Tc minus Ts then counter 13 only outputs values of 0, 1 and 2, although counter 13 should output values of 0–3. A tap coefficient corresponding to the counter output value of 3 would no longer be selected and a filter output corresponding thereto would no longer be provided. In other words, output data would have a dropout.

In contrast, if data period Tc expands to Tc plus Ts, then, with counter 13 inherently only outputting values of 0–3, a tap coefficient corresponding to the counter output value of 3 would be selected twice. A single filter output corresponding thereto would thus be output twice in succession.

In these cases, a filter output varies abruptly, stepwise or the like and the filter's occupied frequency band would for example be widened disadvantageously. The third embodiment is intended to correct a filter output to free the filter from impaired frequency characteristics in the configuration of the second embodiment when a data period varies, such as described above.

Figure 8:
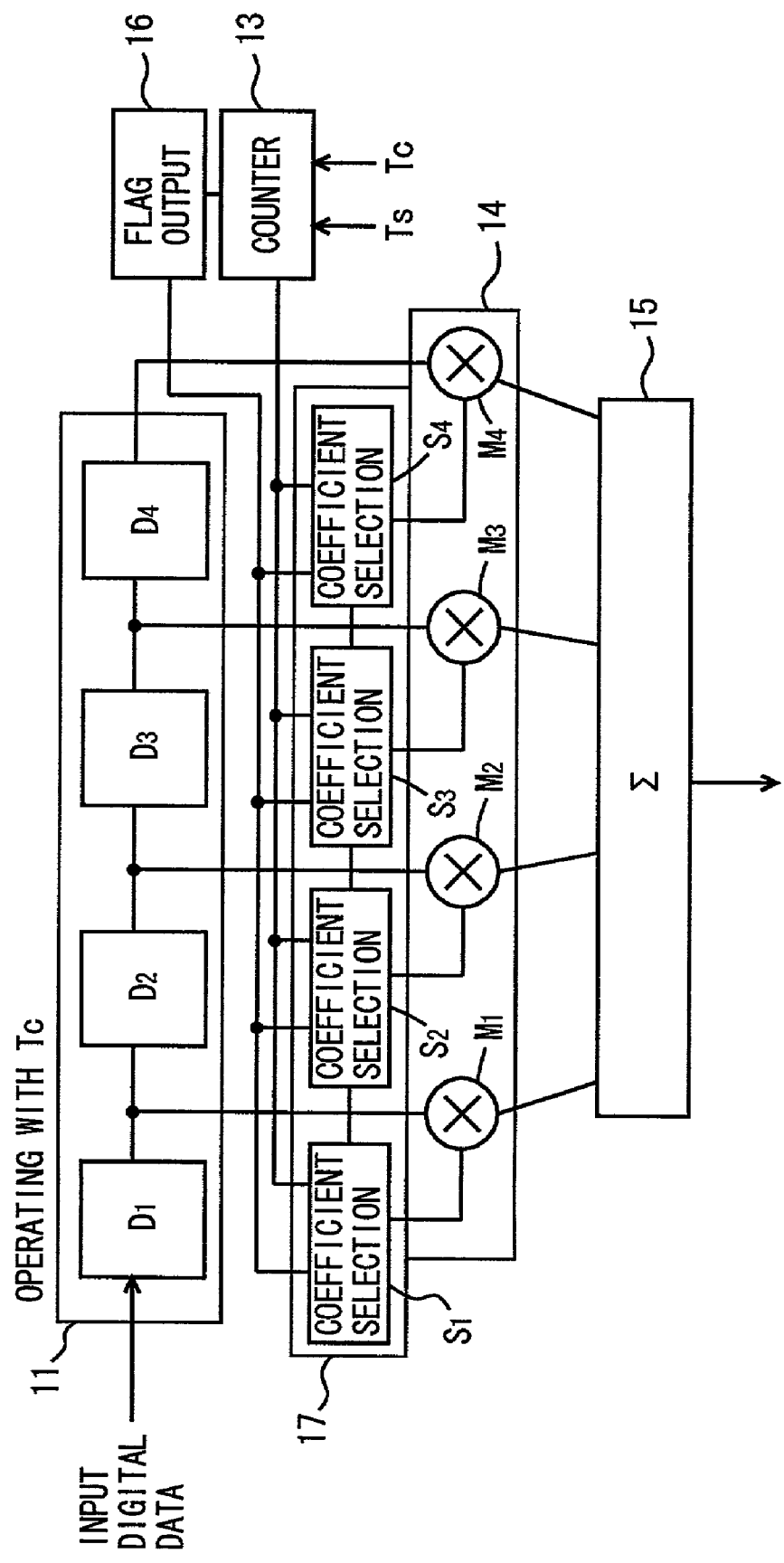
FIG. 8 is a block diagram showing a configuration of the digital roll-off filter of the present invention in a third embodiment.

FIG. 8 is a block diagram showing a configuration of the digital roll-off filter of the present invention in the third embodiment. The digital roll-off filter of the third embodiment shown in FIG. 8 is identical to that of the second embodiment shown in FIG. 4, except for the following:

More specifically, it is provided with a flag output circuit 16 monitoring data period Tc for variation in accordance with a value output from counter 13, and driven by detected variation to output a flag, and a coefficient select circuit 17 in place of coefficient select circuit 12 of FIG. 4.

Note that hereinafter in the third embodiment the digital roll-off filter for the sake of simple illustration includes shift register 11 having four stages and uses sampling period Ts corresponding to one fourth of data period Tc, as described in the second embodiment.

Figure 9:
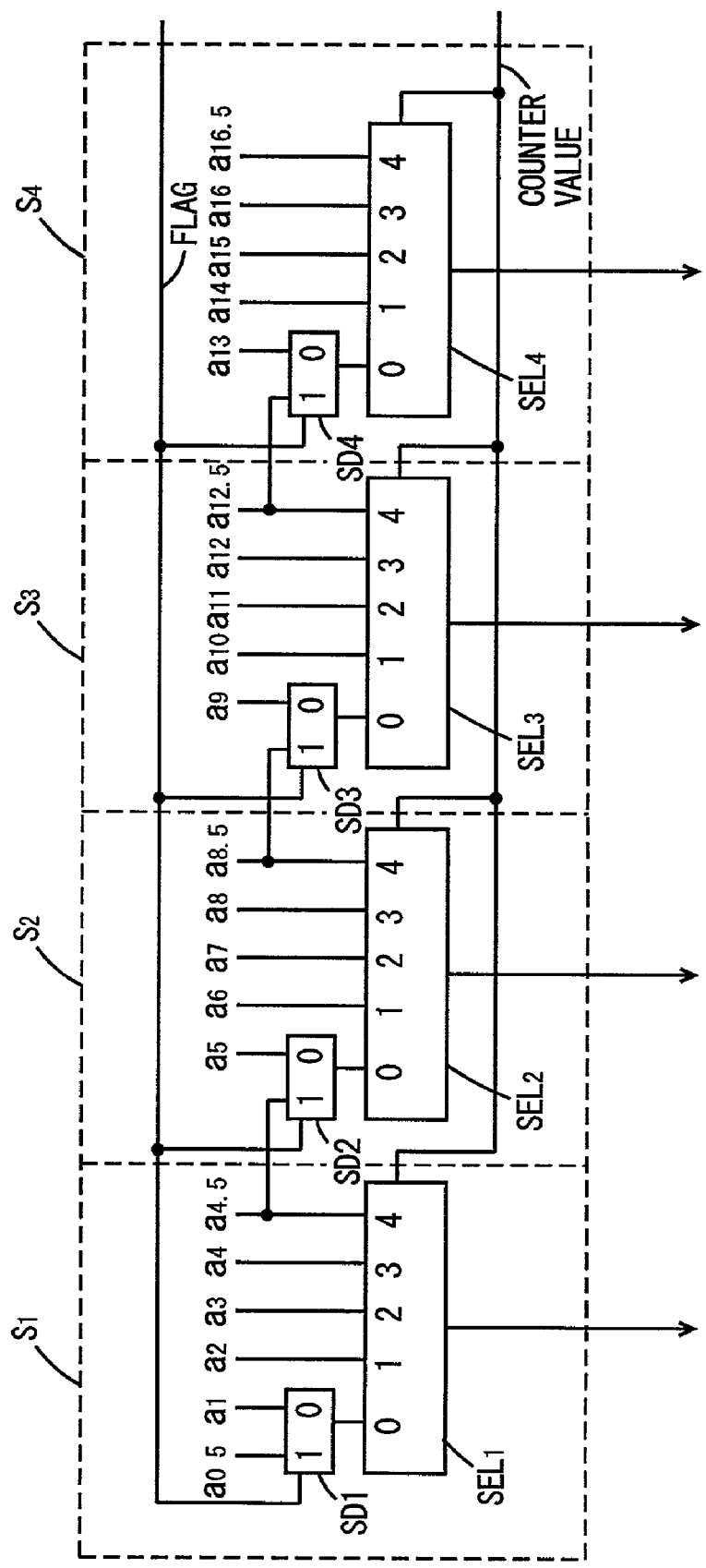
FIG. 9 is a block diagram showing a configuration of a coefficient select circuit shown in FIG. 8.
Figure 10:
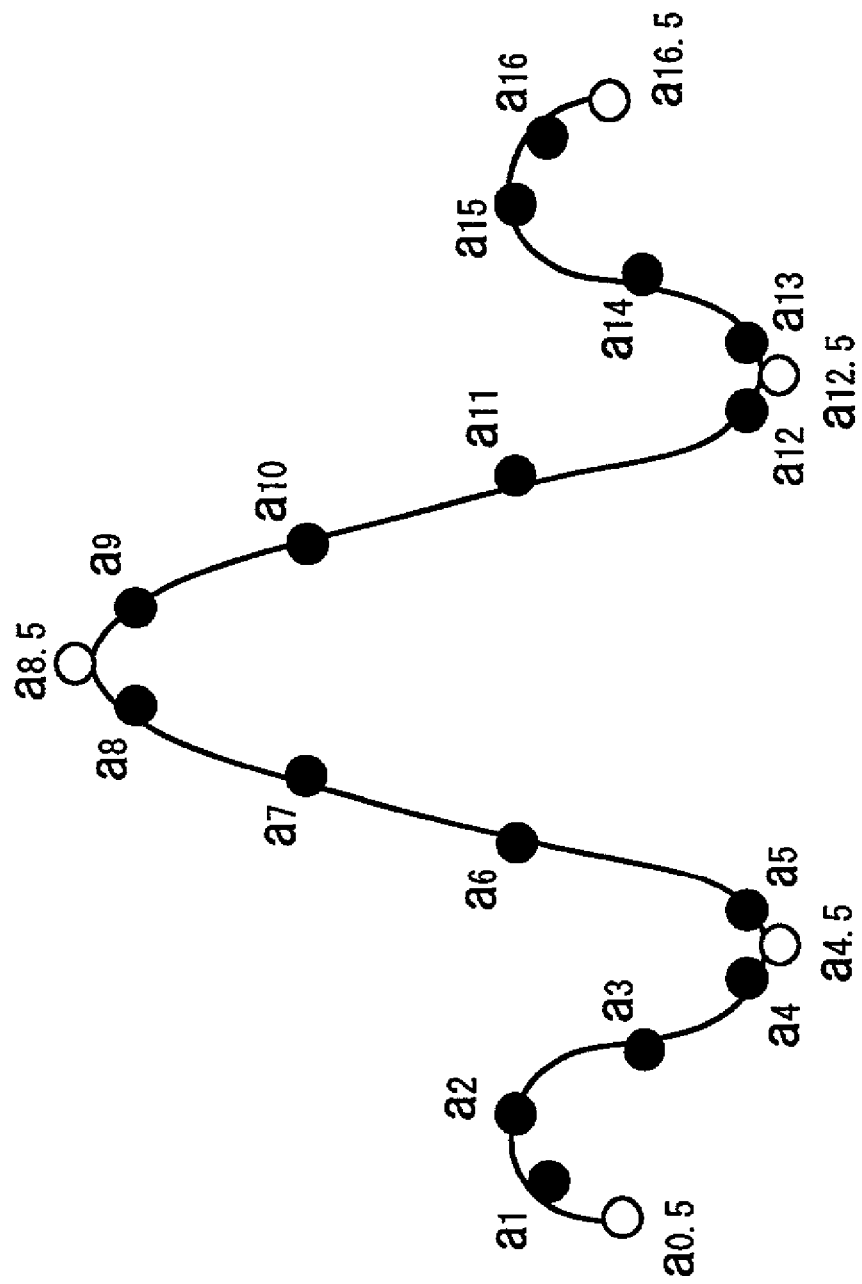
FIG. 10 schematically represents a manner of sampling on an impulse response waveform in the third embodiment.

FIG. 9 is a block diagram showing a configuration of coefficient select circuit 17 shown in FIG. 8. FIG. 10 schematically shows a manner of sampling on an impulse response waveform in the third embodiment.

With reference to FIG. 10 in the third embodiment the 4-stage shift register has four tap outputs, each associated with four sampling points (each represented by a black dot) set in accordance with sampling period Ts. In addition to the total of 16 sampling points a1–a16, the FIG. 10 example also has sampling points a0.5, a4.5, a8.5, a12.5, a16.5 (as represented by a white dot) on boundaries of data periods Tc at intermediate portions within respective sampling intervals Ts. Tap coefficients corresponding to these sampling points are previously stored in a memory (not shown).

These intermediate sampling points are set to allow a tap coefficient of an intermediate point to be shared by tap outputs of adjacent data periods to interpolate tap coefficients when data period Tc varies.

Coefficient select circuit 17 of the third embodiment shown in FIG. 9 is distinguished from coefficient select circuit 12 of the second embodiment shown in FIG. 5, as follows: coefficient selectors $S_1$, $S_2$, $S_3$, $S_4$ commonly receives a flag from flag output circuit 16 in addition to a counter output value output from counter 13.

Coefficient selector $S_1$ is formed of a selector $SEL_1$ and a subdecoder $SD_1$. Similarly, coefficient selectors $S_2$, $S_3$ and $S_4$ are formed of a selector $SEL_2$ and a subdecoder $SD_2$, a selector $SEL_3$ and a subdecoder $SD_3$, and a selector $SEL_4$ and a subdecoder $SD_4$, respectively.

With reference to FIG. 9, tap coefficients (hereinafter a0.5~a4.5) corresponding to sampling points a0.5~a4.5 are provided to coefficient selector $S_1$. In particular, coefficients a0.5 and a1 are provided to subdecoder $SD_1$ which in turn provides an output received by selector $SEL_1$ at input 0, and coefficients a2–a4.5 are received by selector $SEL_1$ at inputs 1–4, respectively.

Then tap coefficients (hereinafter a4.5–a8.5) corresponding to sampling points a4.5–a8.5 are provided to coefficient selector $S_2$. In particular, coefficients a4.5 and a5 are provided to subdecoder $SD_2$ which in turn provides an output received by selector $SEL_2$ at input 0, and coefficients a6–a8.5 are received by selector $SEL_2$ at inputs 1–4, respectively.

Then tap coefficients (hereinafter a8.5–a12.5) corresponding to sampling points a8.5–a12.5 are provided to coefficient selector $S_3$. In particular, coefficients a8.5 and a9 are provided to subdecoder $SD_3$ which in turn provides an output received by selector $SEL_3$ at input 0, and coefficients a10–a12.5 are received by selector $SEL_3$ at inputs 1–4, respectively.

Finally tap coefficients hereinafter a12.5–a16.5) corresponding to sampling points a12.5–a16.5 are provided to coefficient selector $S_4$. In particular, coefficients a12.5 and a13 are provided to subdecoder $SD_4$ which in turn provides an output received by selector $SEL_4$ at input 0, and coefficients a14–a16.5 are received by selector $SEL_4$ at inputs 1–4, respectively.

Counter 13 outputs a value which is in turn input to selectors $SEL_1$ to $SEL_4$ commonly at their respective control inputs. In response to the control input, each selector normally, as will be described hereinafter, switches coefficients of inputs 0–3 of five inputs 0–4 successively in accordance with sampling period Ts and thus selects and outputs the same.

When data period Tc varies, flag output circuit 16 outputs a flag which is in turn input to subdecoders SD1–SD4 commonly. When data period Tc does not have variation, each subdeocder SD selects a tap coefficient of a sampling point (the black dot of FIG. 10) set in accordance with a normal sampling period and provides it to the corresponding selector SEL at input 0.

However, if a flag indicative of variation is output, each subdecoder SD selects a tap coefficient of an intermediate point (a white dot of FIG. 10) and provides it to the corresponding selector SEL at input 0. As a result, in particular, coefficient a4.5 is shared by input 4 of $SEL_1$ and input 0 of $SEL_2$. Furthermore, coefficient a8.5 is shared by input 4 of $SEL_2$ and input 0 of $SEL_3$. Furthermore, coefficient a12.5 is shared by input 4 of $SEL_3$ and input 0 of $SEL_4$.

With reference again to FIG. 8, selectors $SEL_1$ to $SEL_4$ have their respective outputs (tap coefficients) provided to multiplication circuit 14 and received by corresponding multipliers $M_1$–$M_4$ at their respective one inputs. Multipliers $M_1$–$M_4$ have their respective other inputs receiving data (tap outputs) held by corresponding delay elements $D_1$–$D_4$ of shift register 11.

Multipliers $M_1$ to $M_4$ effect their respective multiplications which are in turn added together by an addition circuit 15 and the resultant sum is output from the digital roll-off filter as a filter output.

Figure 11:
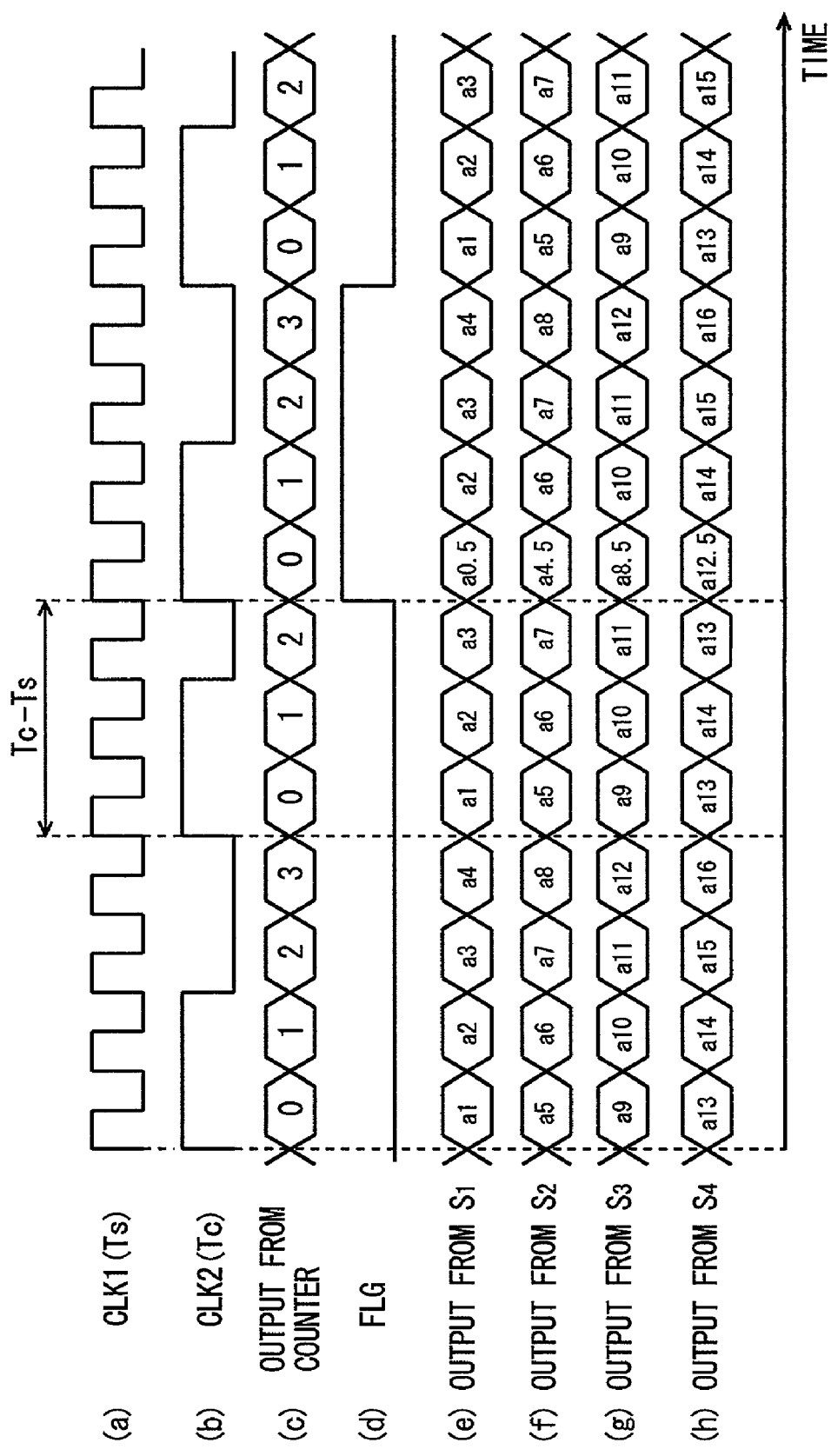
FIG. 11 is timing plots representing an operation of the digital roll-off filter in the third embodiment.

FIG. 11 is timing plots representing an operation of the digital roll-off filter in the third embodiment. Reference will now be made to FIGS. 8–11 to describe an operation of the digital roll-off filter in the third embodiment.

As has been described above, counter 13 receives a clock (CLK1) of sampling period Ts shown in FIG. 11(a) and a clock (CLK2) corresponding to data period Tc of a quadruple frequency shown in FIG. 11(b). Counter 13 counts in response to clock CLK1 and is reset in response to clock CLK2.

Counter 13 thus outputs a value repeating 0, 1, 2 and 3, as shown in FIG. 11(c). This output value is shared by selectors $SEL_1$~$SEL_4$ commonly, and for example selector $SEL_1$ provides an output, as shown in FIG. 11(e).

More specifically, in response to a counter output value of zero, tap coefficient a1 is selected and output, and similarly in response to counter output values of 1, 2 and 3, tap coefficients a2, a3 and a4 are selected and output, respectively. In response to the counter output value repeating, the selector also repeats the aforementioned select operation.

As shown in FIGS. 11(f)–11(h), the other selectors $SEL_2$-$SEL_4$ similarly operate and repeat sequential selection of tap coefficients corresponding to the four sampling points within their corresponding data periods Tc.

As shown in the FIG. 11 timing plots at a center, if data period Tc of clock CLK2 is reduced to Tc minus Ts, then counter 13 is reset earlier than normal by period Ts and it thus only outputs a value up to 2.

Flag output circuit 16 monitors an output of counter 13 and if it detects that an output value ends with 2 then, as shown in FIG. 11(d), in the subsequent data period when data shifts and the counter's value returns to 0, flag output circuit 16 generates a flag having a high level indicating that variation has been introduced and, as has been described previously, flag output circuit 16 provides the flag to subdecoders $SD_1$–$SD_4$ of coefficient select circuit 17. When flag output circuit 16 detects that a counter value has recovered, ending with 3, the flag returns to a low level and thus ends.

When a flag is generated, the FIG. 9 subdecoders $SD_1$–$SD_4$ select intermediate tap coefficients a0.5, a4.5, a8.5, a12.5 and provide them to their corresponding selectors $SEL_1$–$SEL_4$ at input 0.

For example, as shown in FIG. 11(e), if variation is introduced in a data period Tc then in the subsequent data period Tc the initial tap coefficient output of coefficient selector $S_1$ corresponding the counter value of 0 is a0.5, rather than a normal output of a1. For the subsequent count values of 1, 2 and 3, tap coefficients a2, a3 and a4 provided to selector $SEL_1$ at inputs 1-3 are output, as normal.

Similarly, as shown in FIGS. 11(f)–11(h), for the other coefficient selectors $S_1$, $S_2$ and $S_3$ intermediate tap coefficients a4.5, a8.5, a12.5 are output in response to the counter value of 0 and in response to subsequent counter values tap coefficients provided to each selector at inputs 1–3 are output.

Thus, if data period Tc shrinks and a tap coefficient has lost then as a tap coefficient corresponding to the top counter value of 0 in the subsequent data period a tap coefficient of an intermediate point can be used to enable tap coefficient interpolation. More specifically, the data period of interest ends with the final tap coefficient value offset by one and in order to compensate for the offset in the subsequent period a tap coefficient of an intermediate point preceding the top tap coefficient of the subsequent period can be adopted to alleviate an abrupt change in a filter output.

On the other hand, although not shown, if a data period extends for example to Tc+Ts then counter 13 provides a count value extending up to four. For the counter value of four each selector SEL has input 4 selected and selectors $SEL_1$ to $SEL_4$ respectively output intermediate tap coefficients a4.5, a8.5, a12.5, a16.5.

Thus if data period Tc has extended an intermediate tap coefficient allows interpolation and a single tap coefficient would not be output more than once in succession.

Thus in the digital roll-off filter of the third embodiment, if a data period varies, a tap coefficient of a point intermediate between adjacent sampling points on an impulse response waveform, one preceding the variation and the other following it, can be selected to interpolate tap coefficient preceding and following the variation. The digital roll-off filter can thus be free of impaired frequency characteristics.

Fourth Embodiment

As has been described in conjunction with FIG. 17, a mobile radio terminal has spreading modulation portion 30b spreading-modulating transmit data and then has waveform shaping portion 30a then limiting a band by means of the digital roll-off filter of the aforementioned embodiment.

More specifically, spreading modulation portion 30b effects a complex spreading process of transmit digital data and a spreading code. This normally requires four digital roll-off filters, as will be described hereinafter.

Figure 12:
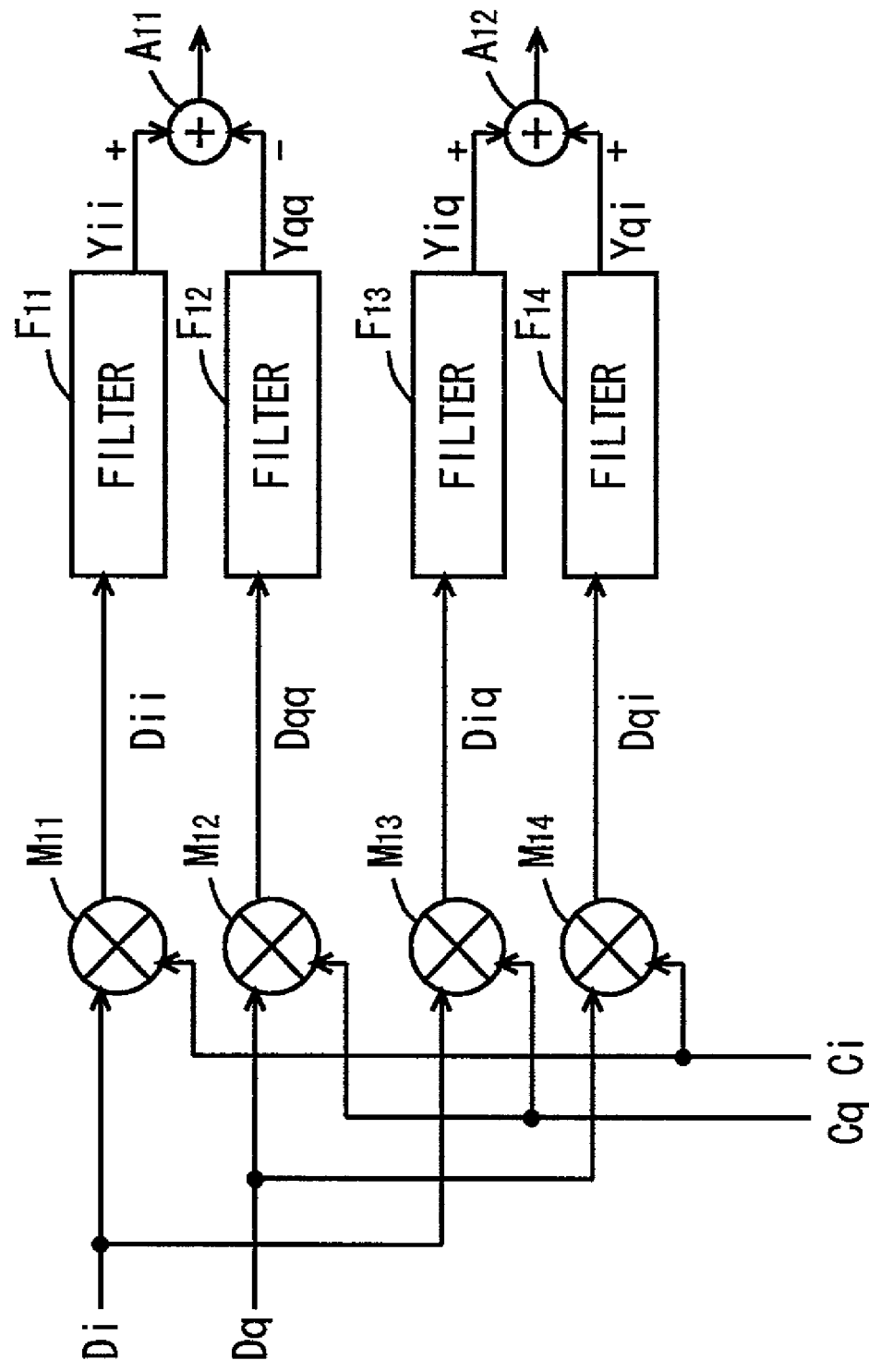
FIG. 12 is a block diagram showing an arrangement of filters for transmit digital data complex-spread.

FIG. 12 is a block diagram showing an arrangement of filters for transmit digital data having undergone a complex spreading process.

With reference to FIG. 12, transmit digital data for example in a well known, Quadrature Phase Shift Keying (QPSK) or Binary Phase Shift Keying (BPSK) system is formed of two types of signals, an in-phase data signal Di and a quadrature data signal Dq. Such transmit data is spread by a spreading code formed of two types of signals, an in-phase code Cq and a quadrature code Ci.

In this case the complex spreading process is effected by calculating $(Dj+jDq)\times(Ci+jCq)$. This expression is developed into $(DiCi-DqCq)+j(DiCq+DqCi)$ and a configuration effecting this operation is required.

Accordingly the signals of the former two types and those of the latter two types are mutually multiplied in four multipliers $M_{11}$–$M_{14}$ to form four types of complex output data DiCi (Dii), DqCq (Dqq), DiCq (Diq), DqCi (Dqi).

The four types of transmit digital data are limited in band and a subtraction in parentheses of a real part and an addition in parentheses of an imaginary part are then effected. For such band limitation, filters $F_{11}$, $F_{12}$, $F_{13}$, $F_{14}$, the digital roll-off filter described in the second or third embodiment, are provided.

Filters $F_{11}$ and $F_{12}$ provide band-limited outputs Yii and Yqq, which are in turn subtracted in an adder $A_{11}$. Filters $F_{13}$ and $F_{14}$ provide band-limited outputs Yiq and Yqi, which are in turn added in an adder $A_{12}$. The aforementioned, complex spreading operation is thus effected.

Multipliers $M_{11}$–$M_{14}$ and adders $A_{11}$ and $A_{12}$ configure spreading modulation portion 30b of FIG. 17. Furthermore, filters $F_{11}$–$F_{14}$ configure waveform shaping portion 30a of FIG. 17.

Note that four filters are used to separately provide band limitation before adders provide addition and subtraction for the following reason: for example, transmit data signals Di, Dq can be weighted, as required. For example if Di is weighted with β then $(\beta Di+jDq)\times(Ci+jCq)$ is calculated, which invites calculating $(\beta DiCi-DqCq)+j(\beta DiCq+DqCi)$.

As such, performing an operation of DiCi (Dii) and DiCq (Diq) and limiting a band before multiplying Yii and Yiq by β eliminates the necessity of multi-value operation and thus allows a circuit configuration to be simplified. Thus normally for four inputs Dii, Dqq, Diq. Dqi individual four filter circuits $F_{11}$-$F_{14}$ are correspondingly provided.

On the other hand, however, providing four digital roll-off filters is not preferable in terms of circuit scale.

In accordance with present invention in a fourth embodiment such four filters are partially used in common to allows a simplified circuit configuration.

Figure 13:
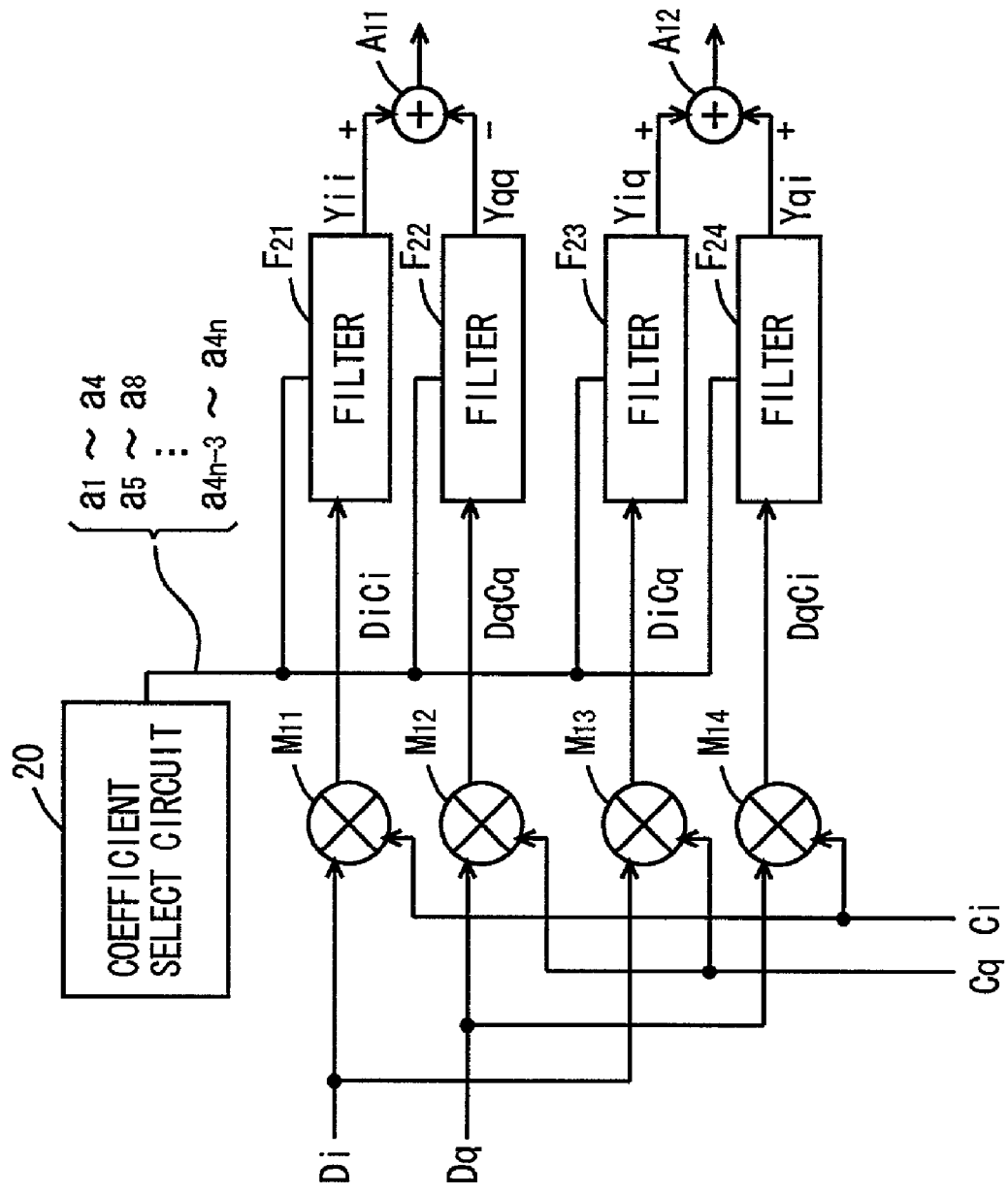
FIG. 13 is a block diagram showing an arrangement of filters of the present invention in a fourth embodiment.

FIG. 13 is a block diagram showing an arrangement of filters in the present embodiment. In the FIG. 13 configuration is identical to the FIG. 12 configuration except the following:

More specifically in FIG. 12 four filters are required, although the filters share a tap coefficient and they all operate at the same timing.

As such, coefficient select circuit 12 and counter 13 shown in the digital roll-off filter of the second embodiment shown in FIG. 4 are not required for each filter. Thus in the fourth embodiment the coefficient circuit and the counter are extracted from each filter and provided as coefficient select circuit 20 of FIG. 13 and shared by the four filters.

Figure 14:
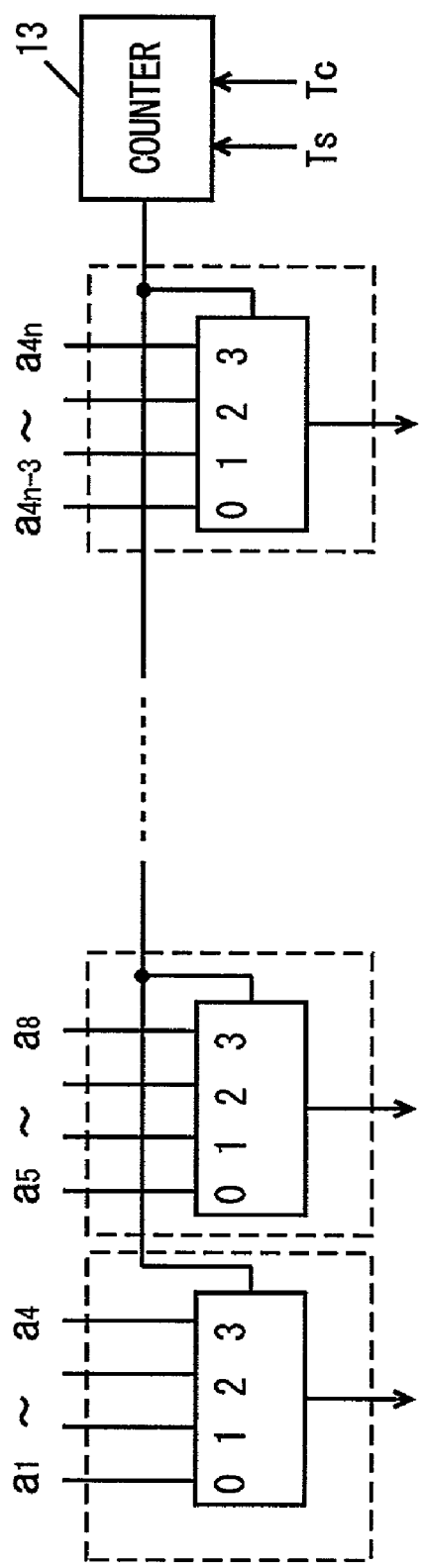
FIG. 14 is a block diagram showing a configuration of a coefficient select circuit shown in FIG. 13.

FIG. 14 is a block diagram showing a configuration of coefficient select circuit 20 of FIG. 13. With reference to FIG. 14, coefficient select circuit 20 is coefficient select circuit 12 of the second embodiment shown in FIG. 5 plus counter 13. Coefficient select circuit 12 and counter 13 operate, as described in the second embodiment, and the description will not be repeated.

Arranging a coefficient select circuit and a counter external to a filter and sharing the same results in filters $F_{21}$–$F_{24}$ each receiving from coefficient select circuit 20 tap coefficients a1–a4n in common and effecting an operation.

Figure 15:
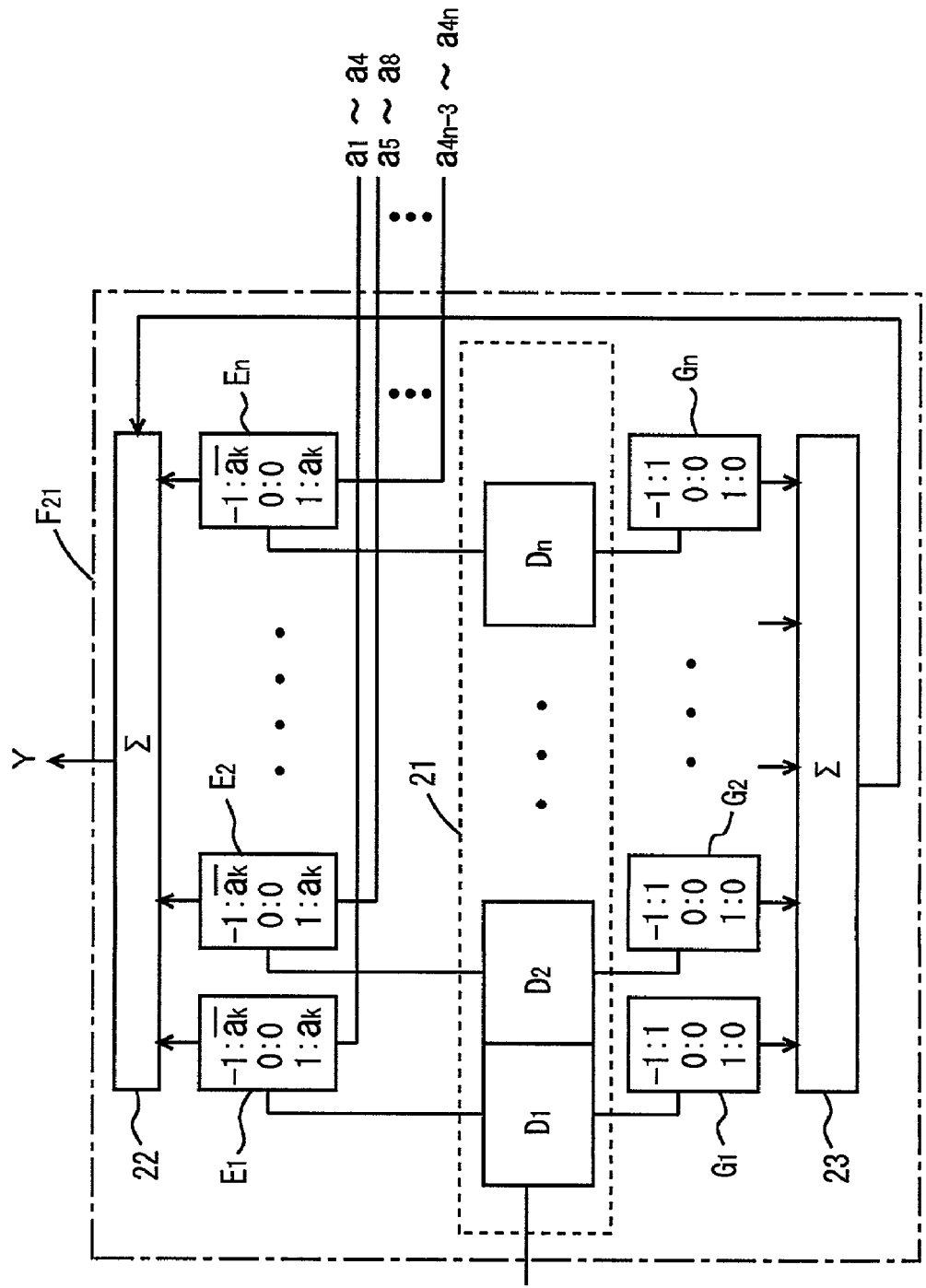
FIG. 15 is a block diagram showing a configuration of the filter shown in FIG. 13.

FIG. 15 is a block diagram showing a configuration of filter $F_{21}$ as an example of a configuration of the filter shown in FIG. 13. Note that the other filters are all identically configured and will thus not be described in detail.

With reference to FIG. 15, n-stage shift register 21 receives and shifts input digital data in accordance with data period Tc successively. From coefficient select circuit 20 of FIG. 14 tap coefficients a1–a4 are sequentially selected and input to an inverting and non-inverting circuit $E_1$, tap coefficients a5–a8 are sequentially selected and input to an inverting and non-inverting circuit $E_2$, and furthermore tap coefficients a4n–3 to a4n are sequentially selected and input to an inverting and non-inverting circuit $E_n$.

For the aforementioned QPSK and BPSK data, a tap coefficient and a tap output can be multiplied by a multiplier provided in the form of an inverting and non-inverting circuit operative in response to the shift register's tap outputs of 0, −1 or 1 to set a provided tap coefficient to have a value of 0, to invert it, or to provide it free of inversion, respectively.

More specifically, the FIG. 15 inverting and non-inverting circuits $E_1$–$E_n$ each respond to the shift register's corresponding tap output of −1 by inverting the current tap coefficient ak and output it to adder 22. If the tap outputs 0 the circuit outputs 0 to adder 22. If the tap outputs 1 the current tap coefficient ak is exactly output to adder 22.

Such an inversion is effected to allow conversion to a negative value in two's complement representation and inversion alone results in an error of +1. Accordingly, positive/negative decision circuits $G_1$–$G_n$ are provided for stages or tap outputs, respectively, of the shift register and only when the corresponding tap outputs −1 a value of 1 is output to adder 23. Then adder 23 provides an output, which is added to a result of an addition provided by adder 22 and an error is compensated for.

Thus in the digital roll-off filter of the fourth embodiment if a plurality of identically configured filter circuits are required for a plurality of types of input digital data, such as when transmit digital data is complex-spread by a spreading code, a circuit for selecting a tap coefficient can be extracted from respective filter circuits to provide a single shared circuit. A significantly simplified circuit configuration can thus be achieved.

Note that the second and third embodiments with QPSK and BPSK data can also use a multiplier in the form of the aforementioned inverting and non-inverting circuit.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital roll-off filter comprising:
    a shift register having a predetermined number of tap outputs and holding input digital data while delaying said input digital data in accordance with a data period sequentially;
    a memory holding tap coefficients respectively corresponding to sampling points set on a desired impulse response waveform having roll-off characteristics, a sampling point being of an oversampling period corresponding to 1/m of said data period, m being a positive integer, said memory also holding tap coefficients each corresponding to a point intermediate between said sampling points immediately adjacent and sandwiching a boundary of said data period;
    a counter operative to count in accordance with said oversampling period and reset in accordance with said data period;
    a period variation detection circuit detecting variation in said data period in response to a maximal value output from said counter;
    tap coefficient selectors equal in number to said predetermined number of tap outputs and provided for said predetermined number of tap outputs, respectively, said counter outputting a value shared by said predetermined number of tap coefficient selectors, said period variation detection circuit outputting a detection output shared by said predetermined number of tap coefficient selectors, each said tap coefficient selector receiving from said memory m tap coefficients corresponding to m sampling points included in said data period of said tap output corresponding thereto and said tap coefficient corresponding to said point intermediate between said sampling points immediately adjacent and sandwiching the boundary of said data period, each said tap coefficient selector repetitively, sequentially selecting said m tap coefficients in response to said value output from said counter, and when said period variation detection circuit detects variation in said data period each said tap coefficient selector further selecting said tap coefficient of said point intermediate between said successive sampling points preceding and following said variation to interpolate said coefficient before and after said variation;
    a multiplication circuit providing respective multiplications of respective data of said predetermined number of tap outputs of said shift register by tap coefficients respectively selected by said predetermined number of tap coefficient selectors; and
    an addition circuit adding said multiplications together for output as a filter output.

2. A mobile radio terminal for digital radio communication, comprising:
    a transmitting modem portion modulating transmit digital data; and
    a radio processing portion subjecting a transmit output of said transmitting modem portion to a radio process for transmission, said transmitting modem portion including a digital roll-off filter for limiting a transmission band of said transmit digital data,
    said digital roll-off filter including:
    a shift register having a predetermined number of tap outputs and holding input digital data while delaying said input digital data in accordance with a data period sequentially;
    a memory holding tap coefficients respectively corresponding to sampling points set on a desired impulse response waveform having roll-off characteristics, a sampling point being of an oversampling period corresponding to 1/m of said data period, m being a positive integer, said memory also holding tap coefficients each corresponding to a point intermediate between said sampling points immediately adjacent and sandwiching a boundary of said data period;
    a counter operative to count in accordance with said oversampling period and reset in accordance with said data period;
    a period variation detection circuit detecting variation in said data period in response to a maximal value output from said counter;
    tap coefficient selectors equal in number to said predetermined number of tap outputs and provided for said predetermined number of tap outputs, respectively, said counter outputting a value shared by said predetermined number of tap coefficient selectors, said period variation detection circuit outputting a detection output shared by said predetermined number of tap coefficient selectors, each said tap coefficient selector receiving from said memory m tap coefficients corresponding to m sampling points included in said data period of said tap output corresponding thereto and said tap coefficient corresponding to said point intermediate between said sampling points immediately adjacent and sandwiching the boundary of said data period, each said tap coefficient selector repetitively, sequentially selecting said m tap coefficients in response to said value output from said counter, and when said period variation detection circuit detects variation in said data period each said tap coefficient selector further selecting said tap coefficient of said point intermediate between said successive sampling points preceding and following said variation to interpolate said coefficient before and after said variation;
    a multiplication circuit providing respective multiplications of respective data of said predetermined number of tap outputs of said shift register by tap coefficients respectively selected by said predetermined number of tap coefficient selectors; and
    an addition circuit adding said multiplications together for output as a filter output.

* * * * *